(12) United States Patent
Sugahara et al.

(10) Patent No.: US 6,316,922 B1
(45) Date of Patent: Nov. 13, 2001

(54) DC-DC CONVERTER WHICH SUPRESSES POWER SUPPLY NOISE IN LOW POWER CIRCUIT

(75) Inventors: Satoshi Sugahara, Nagano; Yasushi Katayama, Tokyo, both of (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 09/611,636

(22) Filed: Jul. 7, 2000

(30) Foreign Application Priority Data

Jul. 8, 1999 (JP) .................................................. 11-194339

(51) Int. Cl.[7] .................................................. G05F 1/613
(52) U.S. Cl. .................................................. 323/224
(58) Field of Search .................................. 323/224, 222, 323/289, 283, 284, 285

(56) References Cited

U.S. PATENT DOCUMENTS

| | | | |
|---|---|---|---|
| 4,806,842 | * 2/1989 | Bittner | 323/285 |
| 5,014,178 | 5/1991 | Balakrishnan | 363/49 |
| 5,838,147 | * 11/1998 | Suzuki et al. | 323/289 |
| 5,966,003 | * 10/1999 | Takimoto et al. | 323/224 |

OTHER PUBLICATIONS

"A Novel MOSFET Gate Driver for the Complementary Class D Converter"; Louis R. Nerone; 14th annual Applied Power Electronics Conference and Exposition APEC '99; vol. 2, Mar. 14, 1999; pp. 760–763.

* cited by examiner

*Primary Examiner*—Shawn Riley
(74) *Attorney, Agent, or Firm*—Rossi & Associates

(57) ABSTRACT

A DC-DC converter facilitates preventing switching noises, caused by the switching of a main switching transistor and its driver, from affecting a control circuit adversely and securing stable operations of the converter. Specifically, the DC-DC converter includes a feed line LS1 for the main circuit, a ground line LG1 for the main circuit, a positive feed line LS2 for the control circuit, a negative feed line LG2 for the control circuit 3, an insulation resistance Rd1 connected to the feed line LS1 or to the feed line LS2, (or) an insulation resistance Rd2 connected to the ground line LG1 or to the feed line LG2, and, if necessary, a filter capacitor Cd connected in parallel to the control circuit 3.

14 Claims, 16 Drawing Sheets

DC-DC CONVERTER WHICH SUPRESSES POWER SUPPLY NOISE IN LOW POWER CIRCUIT

BACKGROUND

FIG. 28(a) is a block circuit diagram of a first conventional switching DC-DC converter of step-down type. As shown in the figure, a smoothing capacitor Cin for smoothing a DC input voltage Vin, a main switching transistor 1 as a main switching semiconductor device for connecting and disconnecting the DC input voltage Vin, a freewheel diode 11, a coil L, a capacitor Cout, a control circuit 3, a gate driver (hereinafter referred to simply as a "driver") 2, and passive components 4 are provided. In FIG. 28(a), the main switching transistor 1 is a p-channel MOSFET.

The freewheel diode 11 provides a load current path when the main switching transistor 1 is OFF. The coil L and the capacitor Cout are disposed to smooth an output voltage Vout from the DC-DC converter.

The input voltage Vin is connected, as a power supply, to the control circuit 3 and the driver 2. The control circuit 3 detects the output voltage Vout and outputs a control signal 3a for setting the timing of switching on and off the main switching transistor 1 to keep the output voltage Vout at a certain value. The driver 2 outputs a drive signal 2a in response to the control signal 3a from the control circuit 3 to directly switch on and off the main switching transistor 1.

Various attached passive components for the control circuit 3 are collectively represented by the passive components 4 in FIG. 28(a). For example, a capacitor for smoothing the output of the constant voltage source in the control circuit 3, a resistor and a capacitor for setting the oscillator frequency in the control circuit 3 are included in the passive components 4.

FIG. 28(b) is a block circuit diagram of a second conventional switching DC-DC converter of step-down type. FIG. 28(b) shows only a part of the second conventional DC-DC converter different from the corresponding part of the first conventional DC-DC converter. The second conventional DC-DC converter is different from the first conventional DC-DC converter in that the freewheel diode 11 of FIG. 28(a) is replaced by a synchronous commutation transistor 12 formed of an N-channel MOSFET in FIG. 28(b).

The synchronous commutation transistor 12 is switched off and on in response to the drive signal 2b from the driver 2 synchronizing with the ON and OFF of the main switching transistor 1 to provide a load current path when the main switching transistor 1 is OFF.

Since the on-voltage of the transistor may be set lower than the forward voltage drop across the diode, the synchronous commutation transistor 12 used in substitution for the freewheel diode 11 facilitates improving the efficiency of the switching DC-DC converter.

FIG. 29 is a block circuit diagram showing a circuit configuration that integrates the main switching transistor 1, the driver 2 and the control circuit 3 of FIG. 28(a) in a one-chip semiconductor integrated circuit (hereinafter referred to as a "one-chip IC") 100.

In the circuit configuration shown in FIG. 29, the operation of the converter becomes unstable when the load is heavy, presumably because the control circuit malfunctions due to an increase of the switching noise caused by load current increase, and it becomes impossible for the converter to operate properly as the switching frequency increases.

The conditions are worse for the DC-DC converter shown in FIG. 28(b) that incorporates the synchronous commutation transistor 12 in the one-chip IC 100, since the switching noise from the synchronous commutation transistor 12 is added.

In view of the foregoing, it is an object of the invention to provide a DC-DC converter, including a main switching transistor, a driver and a control circuit incorporated in a one-chip IC, that facilitates preventing switching noises, caused by a heavily load or by high-speed switching, from affecting the control circuit adversely and securing stable operations of the control circuit.

SUMMARY OF THE INVENTION

The invention provides a switching DC-DC converter including: a one-chip semiconductor integrated circuit; the one-chip semiconductor integrated circuit including at least a main switching semiconductor device including main terminals and a control terminal (gate), the main switching semiconductor device periodically switching on and off to periodically connect and disconnect a DC power supply, the main switching semiconductor device feeding an output voltage to a load; a control circuit fed from the DC power supply, the control circuit detecting the output voltage outputted from the main switching semiconductor device, the control circuit outputting a control signal indicating the timing of switching on and off the main switching semiconductor device; and a first drive circuit fed from the DC power supply, the first drive circuit feeding a drive signal for directly switching on and off the main switching semiconductor device to the control terminal of the main semiconductor switching device in response to the control signal; the switching DC-DC converter is characterized by inclusion of: a positive feed line and a negative feed line connecting the DC power supply to the control circuit including attached passive components thereof; and a resistor inserted in the positive feed line or in the negative feed line inside or outside the semiconductor integrated circuit, the resistor preventing a noise current from flowing into the control circuit.

Advantageously, the switching DC-DC converter further includes another resistor inserted in the negative feed line or in the positive feed line inside or outside the semiconductor integrated circuit, the other resistor preventing the noise current from flowing into the control circuit.

Advantageously, the switching DC-DC converter further includes a commutation switching semiconductor device in the one-chip semiconductor integrated circuit, the commutation switching semiconductor device including main terminals and a control terminal (gate), one of the main terminals (drain) of the commutation switching semiconductor device being connected to the load-side one (drain) of the main terminals of the main switching semiconductor device, the commutation switching semiconductor device being switched off and on in synchronism with the switching on and off of the main switching semiconductor device to provide a load current path when the main switching semiconductor device is OFF; and a second drive circuit in the one-chip semiconductor integrated circuit, the second drive circuit being fed from the DC power supply, the second drive circuit feeding a drive signal indicating the switching off and on of the commutation switching semiconductor device to the control terminal (gate) of the commutation switching semiconductor device.

Advantageously, the switching DC-DC converter further includes a capacitor disposed inside or outside the semiconductor integrated circuit, the capacitor dividing the noise current, the capacitor being connected between the positive feed line and the negative feed line without any of the resistors interposed between the capacitor and the feed lines.

Advantageously, the positive feed line or the negative feed line connects the resistor incorporated in the semiconductor integrated circuit to the control circuit without any lead-out terminal of the semiconductor integrated circuit interposed between the control circuit and the resistor.

Advantageously, the positive feed line and the negative feed line connect the respective resistors incorporated in the semiconductor integrated circuit to the control circuit without any lead-out terminal of the semiconductor integrated circuit interposed between the control circuit and the resistors.

Advantageously, the capacitance of the capacitor is the parasitic capacitance of the semiconductor integrated circuit.

The switching DC-DC converter according to the invention inserts an insulation resistor (filter resistor) between a feed line, to which a main switching transistor, a driver and, if necessary, a synchronous commutation transistor are connected directly or via low impedance, and a positive feed line for feeding electric power to a control circuit including an analog circuit very easily affected adversely by noises and an attached circuit including passive components, and (or) an insulation resistor between a ground line and a negative feed line. If necessary, the switching DC-DC converter according to the invention further includes a filter capacitor connected in parallel to the control circuit. The switching DC-DC converter according to the invention facilitates preventing a noise current from flowing into the control circuit including the attached components thereof from the noise sources such as the switching devices and the driver and stabilizing the operations of the control circuit.

BRIEF DESCRIPTION OF THE DRAWING FIGURES

DETAILED DESCRIPTION OF THE PREFERRED EMBODIMENTS

FIGS. 1(a) through 1(f) show various types of circuit connection from a power supply (more in detail a feed line LS1 and a ground line LG1) to a control circuit 3 in a switching DC-DC converter according to the invention including a one-chip IC 100 that incorporates at least a main switching transistor 1, a gate driver 2 and the control circuit 3 therein.

Although not shown in FIGS. 1(a) through 1(f), the control circuit 3 includes the attached circuits thereof such as the passive components 4 described above with reference to FIG. 28(a). The low impedance circuit, that includes the main switching transistor 1, the load circuit of the transistor 1 and the driver 2, and through that a relatively high current flows, will be referred to as the "main circuit" for the sake of convenience.

FIG. 1 (a) shows a first type of circuit connection from the power supply to the control circuit in the switching DC-DC converter according to the invention. In FIG. 1(a), an insulation resistor Rd1 is inserted between a feed line LS1 and a feed line LS2 for the control circuit. The feed line LS1 is a positive feed line that connects a DC power supply with the driver 2 and/or the main switching transistor 1 directly. The feed line LS2 is a positive feed line connected directly to the control circuit 3.

An insulation resistor Rd2 is inserted between a ground line LG1 and a feed line LG2 for the control circuit. The ground line LG1 is a negative feed line, that connects the DC power supply with a not shown load circuit and such circuits to be connected with the main switching transistor with relatively low impedance, and/or the driver 2 directly. The feed line LG1 is a negative feed line connected directly to the control circuit 3.

The inserted insulation resistors Rd1 and Rd2 insulate the control circuit 3 from the noises caused in the main circuit. (To describe in other words, the insulation resistors Rd1 and Rd2 prevent the noise current from flowing from the main circuit to the control circuit 3.)

Hereinafter, the insulation resistors Rd1 and Rd2 will be sometimes referred to as the "filter resistor".

Figure 1A:
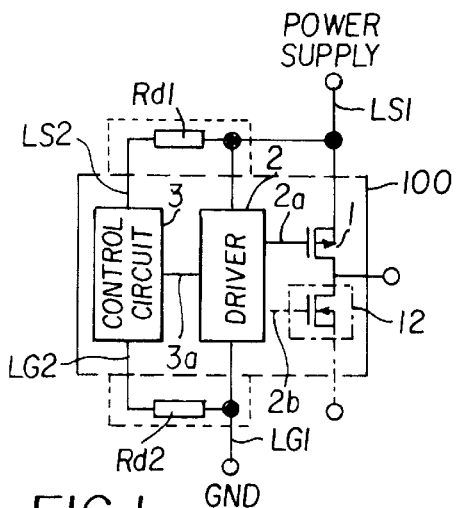
FIG. 1(a) shows a first type of circuit connection from the power supply to the control circuit in the switching DC-DC converter according to the invention.
Figure 1D:
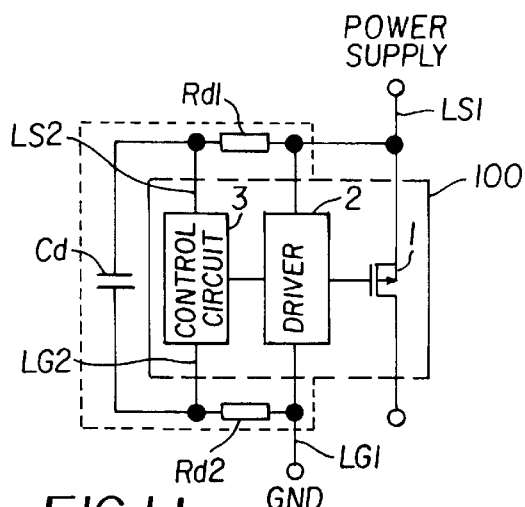
FIG. 1(d) shows a fourth type of circuit connection from the power supply to the control circuit in the switching DC-DC converter according to the invention.
Figure 1B:
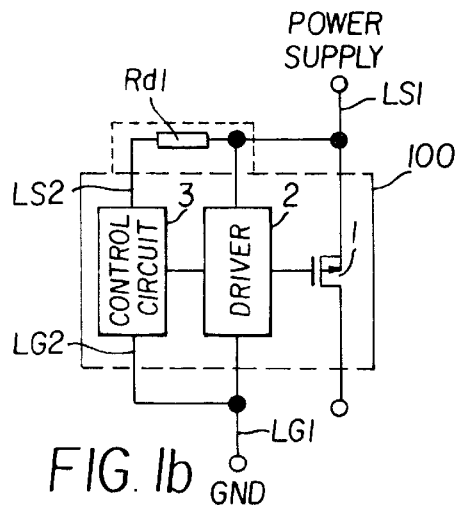
FIG. 1(b) shows a second type of circuit connection from the power supply to the control circuit in the switching DC-DC converter according to the invention.

FIG. 1(b) shows a second type of circuit connection from the power supply to the control circuit in the switching DC-DC converter according to the invention. The second type of circuit connection eliminates the insulation resistor Rd2 of FIG. 1(a) and insulates the control circuit 3 from the noises caused in the main circuit solely by the insulation resistor Rd1.

Figure 1E:
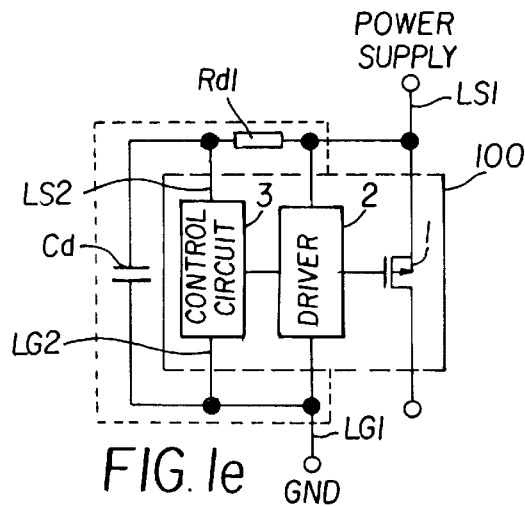
FIG. 1(e) shows a fifth type of circuit connection from the power supply to the control circuit in the switching DC-DC converter according to the invention.
Figure 1C:
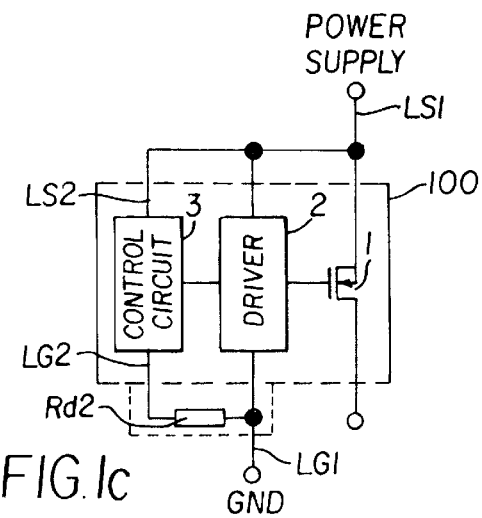
FIG. 1(c) shows a third type of circuit connection from the power supply to the control circuit in the switching DC-DC converter according to the invention.

FIG. 1(c) shows a third type of circuit connection from the power supply to the control circuit in the switching DC-DC converter according to the invention. The third type of circuit connection eliminates the insulation resistor Rd1 of FIG. 1(a) and insulates the control circuit 3 from the noises caused in the main circuit solely by the insulation resistor Rd2.

FIG. 1(d) shows a fourth type of circuit connection from the power supply to the control circuit in the switching DC-DC converter according to the invention. The fourth type of circuit connection includes a filter capacitor Cd connected between the feed lines LS2 and LG2 of FIG. 1(a), i.e. in parallel with the control circuit 3, and bypasses the high frequency component of the noise that leaks through the insulation resistors Rd1 and Rd2 from the main circuit.

FIG. 1(e) shows a fifth type of circuit connection from the power supply to the control circuit in the switching DC-DC converter according to the invention. The fifth type of circuit connection includes a filter capacitor Cd connected between the feed lines LS2 and LG2 of FIG. 1(b) or between the feed line LS2 and the ground line LG1 of FIG. 1(b), to that the feed line LG2 is connected at the same potential, i.e. in parallel with the control circuit 3, and bypasses the high frequency component of the noise that leaks through the insulation resistor Rd1 from the main circuit.

Figure 1F:
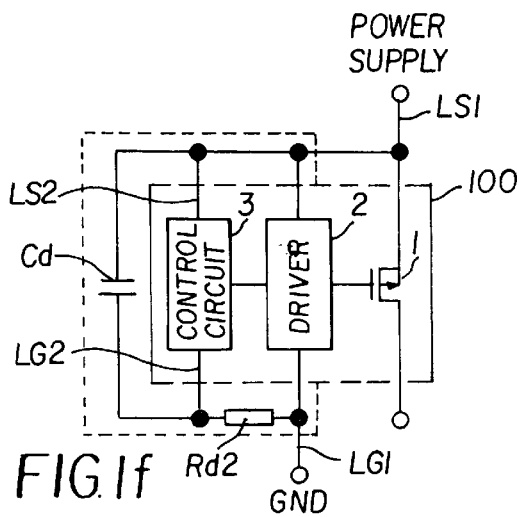
FIG. 1(f) shows a sixth type of circuit connection from the power supply to the control circuit in the switching DC-DC converter according to the invention.

FIG. 1(f) shows a sixth type of circuit connection from the power supply to the control circuit in the switching DC-DC converter according to the invention. The sixth type of circuit connection includes a filter capacitor Cd connected between the feed line LG2 and the feed line LS2 of FIG. 1(c) or between the feed line LG2 and the feed line LS1 of FIG. 1(c), to that the feed line LS2 is connected at the same potential, i.e. in parallel with the control circuit 3, and bypasses the high frequency component of the noise that leaks through the insulation resistor Rd2 from the main circuit.

Now the theoretical characteristics of a low path filter consisted of the filter resistors (insulation resistor) Rd1, Rd2 and the filter capacitor Cd will be described. The gain of a filter consisted of a filter capacitor Cd and a filter resistor Rd is described by the following equation (1) for the voltage Vn0 of the noise component, the frequency thereof is f and contained in the power supply voltage fed to the entire IC, and for the voltage Vn1 of the noise component, the frequency thereof is f and contained in the power supply voltage fed directly to the control circuit 3. The cutoff frequency $f_C$ of the filter is described by the following equation (2).

$$Vn1/Vn0 = 1/\sqrt{(1+(2\pi f\, Cd\, Rd)^2)} \qquad (1)$$

Here, "f" is a frequency of the noise component.

$$f_c = 1/(2 Cd Rd) \qquad (2)$$

Here, the filter resistance Rd is a sum of the filter resistance (insulation resistance) Rd1 and the filter resistance Rd2. When the filter resistor Rd1 or Rd2 is not used, the resistance Rd1 or Rd2 of the unused insulation resistor is set at 0.

By setting the filter resistance Rd at a value much larger than the impedance at the noise frequency of the control circuit 3, by setting the impedance at the noise frequency of the filter capacitor Cd at a value much lower than the impedance at the noise frequency of the control circuit 3 and by adjusting the relation between the capacitance Cd of the filter capacitor and the resistance Rd of the filter resistor based on the equation (2), the cutoff frequency of the noise flowing into the control circuit 3 is determined.

Figure 28A:
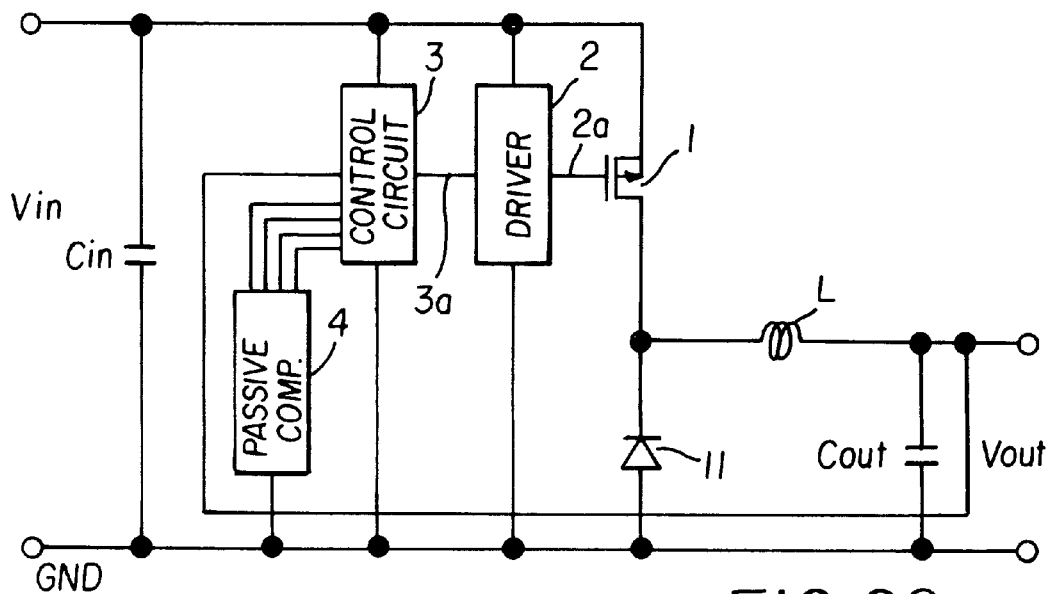
FIG. 28(a) is a block circuit diagram of a conventional switching DC-DC converter of step-down type.
Figure 28B:
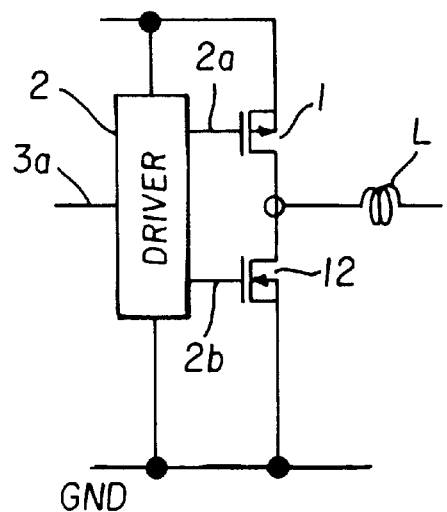
FIG. 28(b) is a block circuit diagram of another conventional switching DC-DC converter of step-down type.
Figure 29:
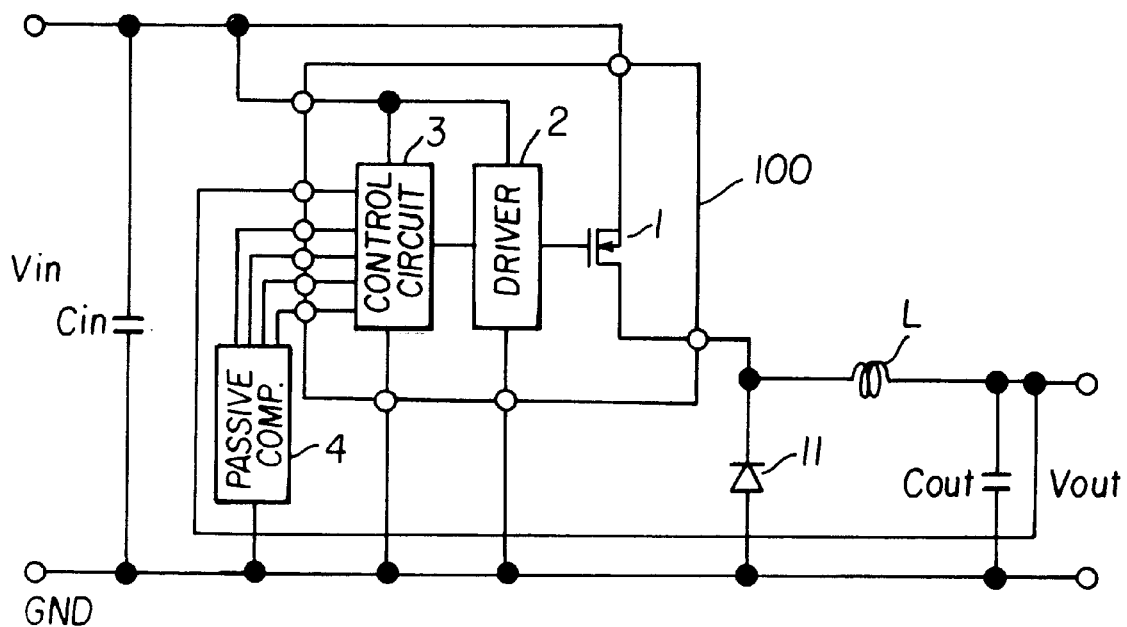
FIG. 29 is a block circuit diagram showing a circuit configuration that integrates the main switching transistor, the driver and the control circuit of FIG. 28(a) in a one-chip semiconductor integrated circuit.

The same circuit connections for insulating the control circuit 3 from the noise sources in the main circuit are applicable also to the switching DC-DC converter of synchronous commutation type as described with reference to FIG. 28(b). The switching DC-DC converter of synchronous commutation type of FIG. 28(b) employs a synchronous commutation transistor 12 in substitution for the freewheel diode 11 used in the switching DC-DC converter of asynchronous commutation type and incorporates the transistor 12 in the one-chip IC 100. Although more amounts of noises are caused in the switching DC-DC converter of synchronous commutation type due to the transistor 12 added to the main circuit as surrounded by single-dotted chain lines in FIG. 1(a), the first through sixth types of connection shown in FIGS. 1(a) through 1(f) are applicable to the both types of the switching DC-DC converters. The circuit connections according to the invention are especially effective to prevent malfunction of the converter of synchronous commutation type, therein more amounts of noises are caused.

In each type of the circuit connections, the insulation resistors Rd1, Rd2 and the filter capacitor Cd may be incorporated in the one-chip IC 100 or disposed outside the one-chip IC 100.

When the parasitic capacitance of the IC is used in substitution for the individual capacitor, the filter capacitor Cd may be omitted.

By incorporating the insulation resistors Rd1, Rd2 and the filter capacitor Cd in the one-chip IC 100, the number of constituent parts and components and the dimensions of the entire control system are reduced effectively. Moreover, since the wiring of the feeder lines directly connected to the control circuit 3 is completed in the IC 100, the number of IC terminals is reduced.

In the following, the first through sixth types of connections shown in FIGS. 1(a) through 1(f) will be described in more detail in connection with the embodiments thereof according to the invention.

First Embodiment

Figure 2:
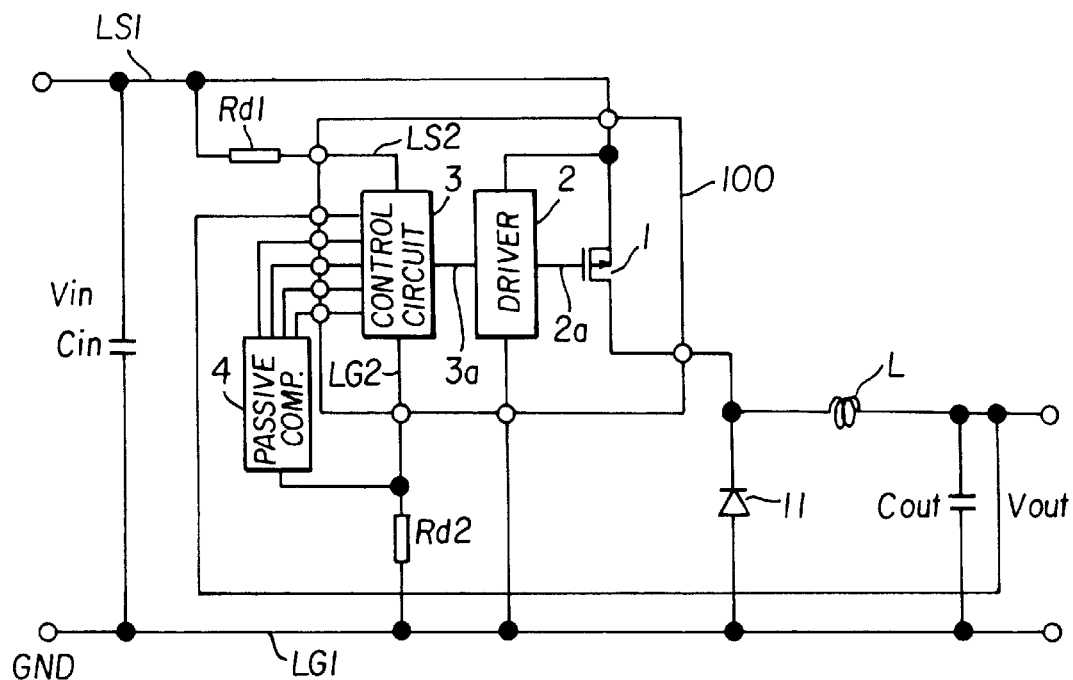
FIG. 2 is a block diagram of a switching DC-DC converter according to a first embodiment of the invention.

FIG. 2 is a block diagram of a switching DC-DC converter according to a first embodiment of the invention. The switching DC-DC converter according to the first embodiment features two external insulation resistors and asynchronous commutation. The switching DC-DC converter according to the first embodiment may be classified into the first type of circuit connection shown in FIG. 1(a).

Referring now to FIG. 2, the switching DC-DC converter according to the first embodiment has the same basic structure with the first conventional switching DC-DC converter described with reference to FIG. 28(a). The switching DC-DC converter according to the first embodiment includes a one-chip IC 100 that incorporates a control circuit 3, a driver 2 and a main switching transistor 1.

A positive feed line LS2 for the control circuit 3 is connected to a positive feed line LS1 for the driver 2 and for the main switching transistor 1 via an insulation resistor Rd1 disposed outside the IC 100. A negative feed line LG2 for the control circuit 3 is connected to a ground line LG1 via an insulation resistor Rd2 disposed outside the IC 100. The ground line LG1 is a return path for low-impedance circuits, such as a coil L, a capacitor Cout and a not shown load circuit connected to the load-side main terminal (drain in this case) of the main switching transistor 1 and for the driver 2. The insulation resistors Rd1 and Rd2 insulate the control circuit 3 from the noise caused in the main circuit so that a noise current may be prevented from flowing into the control circuit 3 from the main circuit.

In the embodiments according to the invention, the input voltage Vin of the switching DC-DC converter is 5 V, the output voltage Vout thereof is 2.5 V, and the switching frequency thereof is 3 MHz.

When the insulation resistor Rd2 is disposed on the side of the ground line LG1, the output voltage Vout that the control circuit 3 detects contains a DC voltage drop across the insulation resistor Rd2. However, since the insulation resistance Rd2 is around 100 and a DC current of several mA flows from the control circuit 3 to the insulation resistor Rd2 in practice, the DC voltage drop across the insulation resistor Rd2 is negligible with respect to the output voltage Vout.

Second Embodiment

Figure 3:
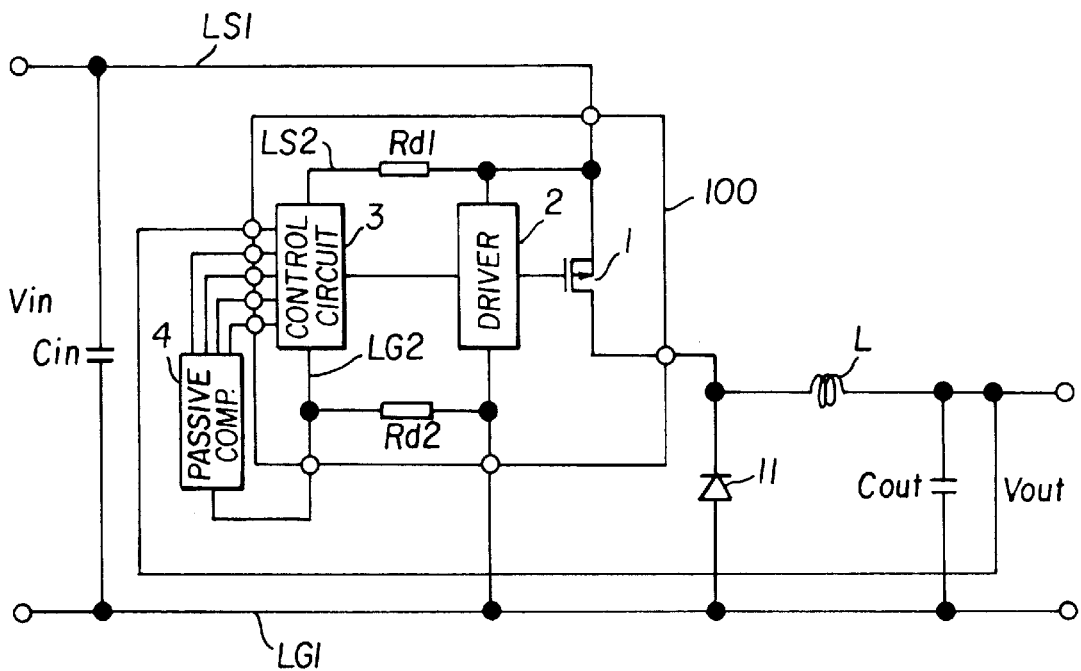
FIG. 3 is a block diagram of a switching DC-DC converter according to a second embodiment of the invention.

FIG. 3 is a block diagram of a switching DC-DC converter according to a second embodiment of the invention. The switching DC-DC converter according to the second embodiment is featured by two internal insulation resistors and asynchronous commutation. The switching DC-DC converter according to the second embodiment may be classified into the first type of circuit connection.

The switching DC-DC converter according to the second embodiment shown in FIG. 3 is different from the switching DC-DC converter shown in FIG. 2 in that the insulation resistors Rd1 and Rd2 are incorporated in a one-chip IC 100. Since the feed line LS2 for the control circuit is connected to the insulation resistor Rd1 in the IC 100 as shown in FIG. 3, the number of lead-out terminals of the IC 100 is reduced.

Third Embodiment

Figure 4:
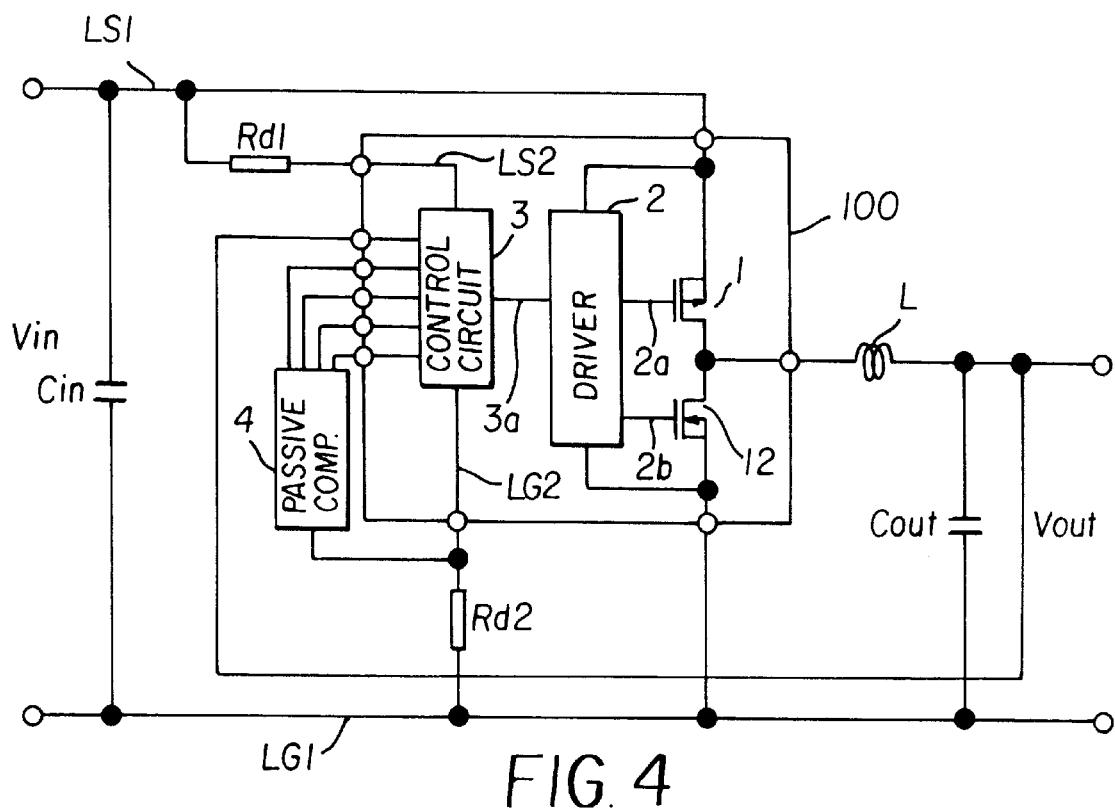
FIG. 4 is a block diagram of a switching DC-DC converter according to a third embodiment of the invention.

FIG. 4 is a block diagram of a switching DC-DC converter according to a third embodiment of the invention. The switching DC-DC converter according to the third embodiment features two external insulation resistors and synchronous commutation. The switching DC-DC converter according to the third embodiment may be classified into the first type of circuit connection.

The switching DC-DC converter according to the third embodiment shown in FIG. 4 is different from the switching DC-DC converter shown in FIG. 2 in that a synchronous commutation transistor 12 is used in substitution for the freewheel diode 11 of FIG. 2 and incorporated in a one-chip IC 100 in the switching DC-DC converter according to the third embodiment.

Since more amount of noises is caused in the DC-DC converter of synchronous commutation type that employs the synchronous commutation transistor 12 than in the DC-DC converter of asynchronous commutation type that employs the freewheel diode 11, the circuit connection according to the invention is especially effective for the DC-DC converter of synchronous commutation type.

Fourth Embodiment

Figure 5:
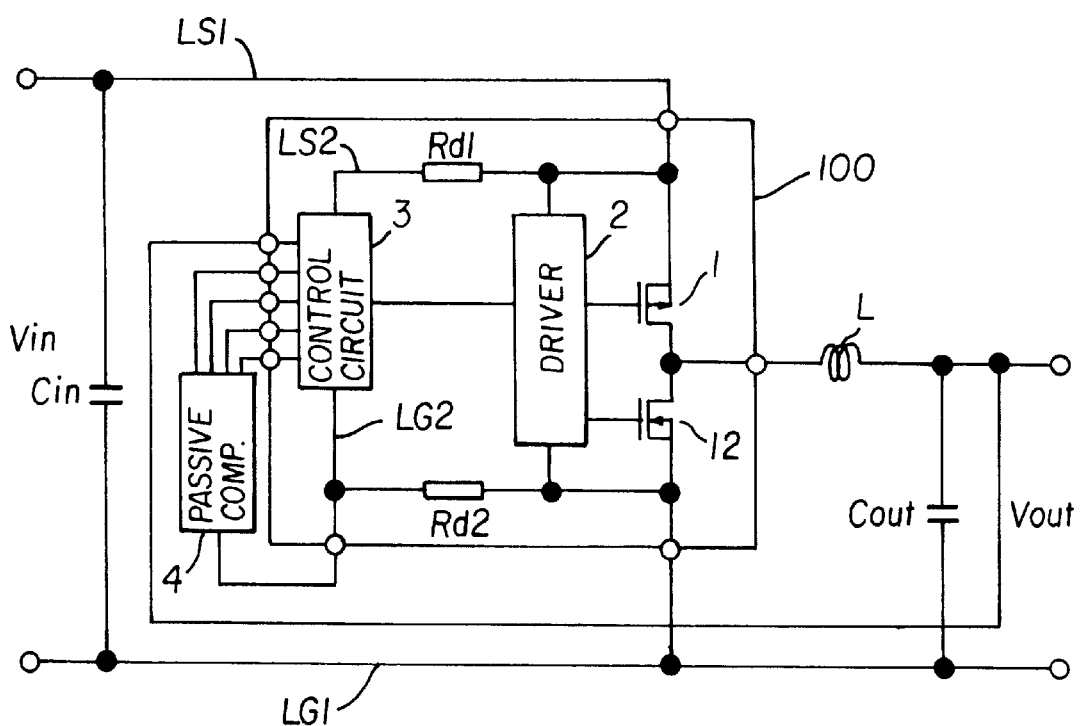
FIG. 5 is a block diagram of a switching DC-DC converter according to a fourth embodiment of the invention.

FIG. 5 is a block diagram of a switching DC-DC converter according to a fourth embodiment of the invention. The switching DC-DC converter according to the fourth embodiment features two internal insulation resistors and synchronous commutation. The switching DC-DC converter according to the fourth embodiment may be classified into the first type of circuit connection.

The switching DC-DC converter according to the fourth embodiment shown in FIG. 5 is different from the switching DC-DC converter according to the second embodiment shown in FIG. 3 in that a synchronous commutation transistor 12 is used in substitution for the freewheel diode 11 of FIG. 3 and incorporated in a one-chip IC 100 in the switching DC-DC converter according to the fourth embodiment.

Fifth Embodiment

Figure 6:
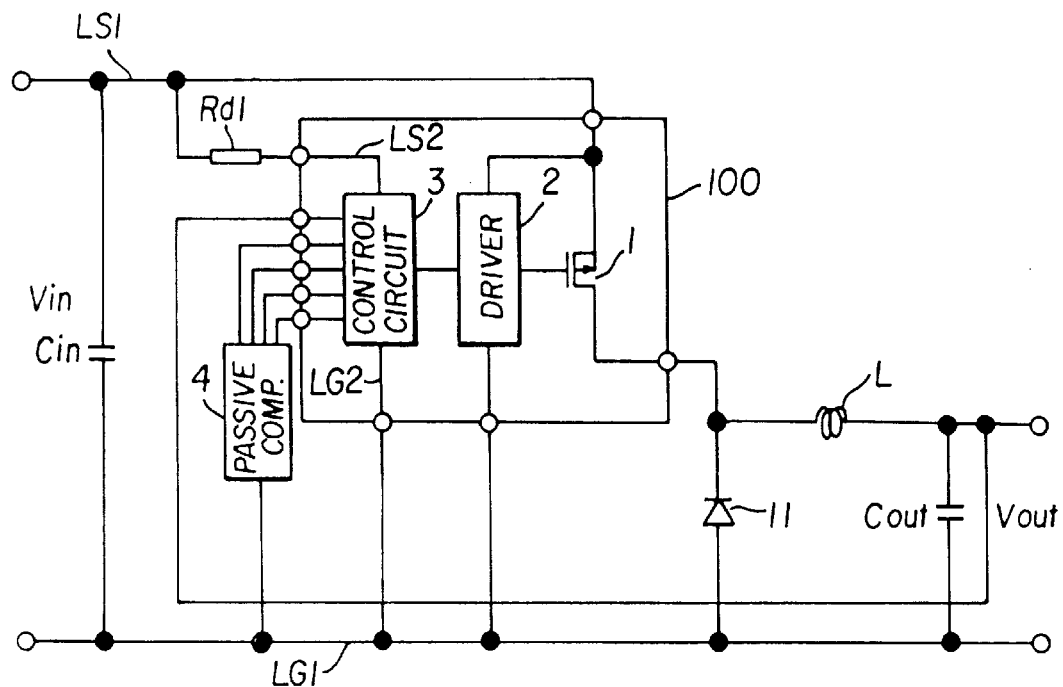
FIG. 6 is a block diagram of a switching DC-DC converter according to a fifth embodiment of the invention.

FIG. 6 is a block diagram of a switching DC-DC converter according to a fifth embodiment of the invention. The switching DC-DC converter according to the fifth embodiment features an external insulation resistor and asynchronous commutation. The switching DC-DC converter according to the fifth embodiment may be classified into the second type of circuit connection shown in FIG. 1(b).

In the switching DC-DC converter according to the fifth embodiment shown in FIG. 6, the insulation resistor Rd2 is eliminated from the circuit configuration of FIG. 2 and a feed line LG2 for a control circuit 3 is connected to a ground line LG1 on the side of a main circuit or to a wiring portion, the potential thereof is the same with the potential of the ground line LG1.

Sixth Embodiment

Figure 7:
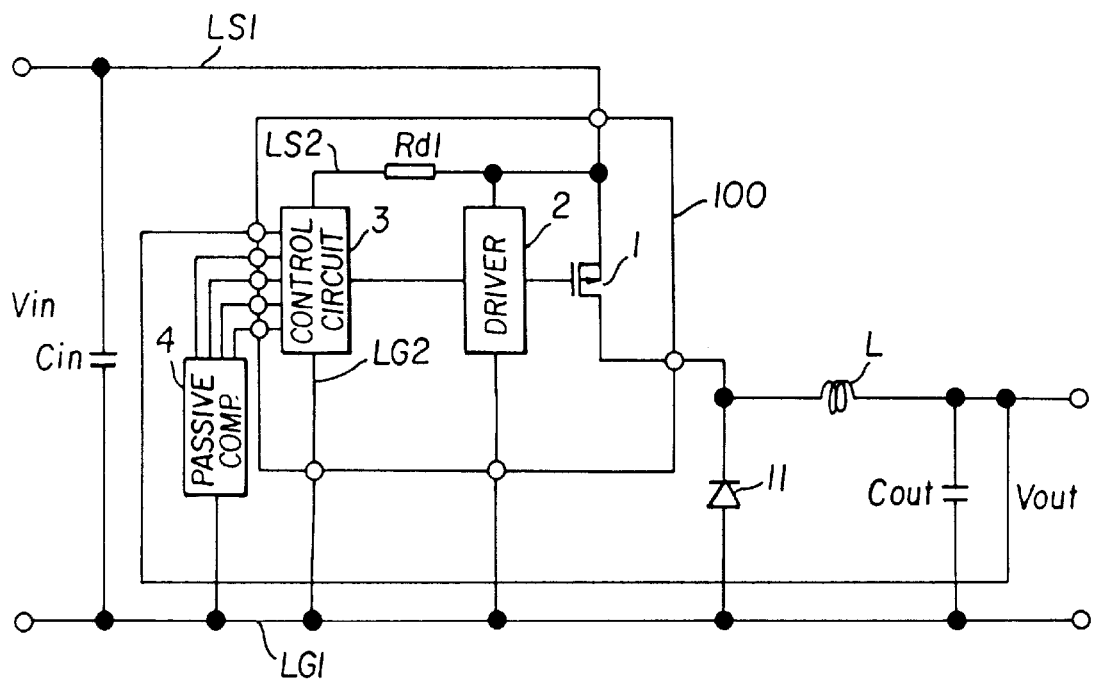
FIG. 7 is a block diagram of a switching DC-DC converter according to a sixth embodiment of the invention.

FIG. 7 is a block diagram of a switching DC-DC converter according to a sixth embodiment of the invention. The switching DC-DC converter according to the sixth embodiment features an internal insulation resistor and asynchronous commutation. The switching DC-DC converter according to the sixth embodiment may be classified into the second type of circuit connection.

In the switching DC-DC converter according to the sixth embodiment shown in FIG. 7, the insulation resistor Rd2 is eliminated from the circuit configuration of FIG. 3 and a feed line LG2 for a control circuit 3 is connected to a ground line LG1 on the side of a main circuit or to a wiring portion, the potential thereof is the same with the potential of the ground line LG1.

Seventh Embodiment

Figure 8:
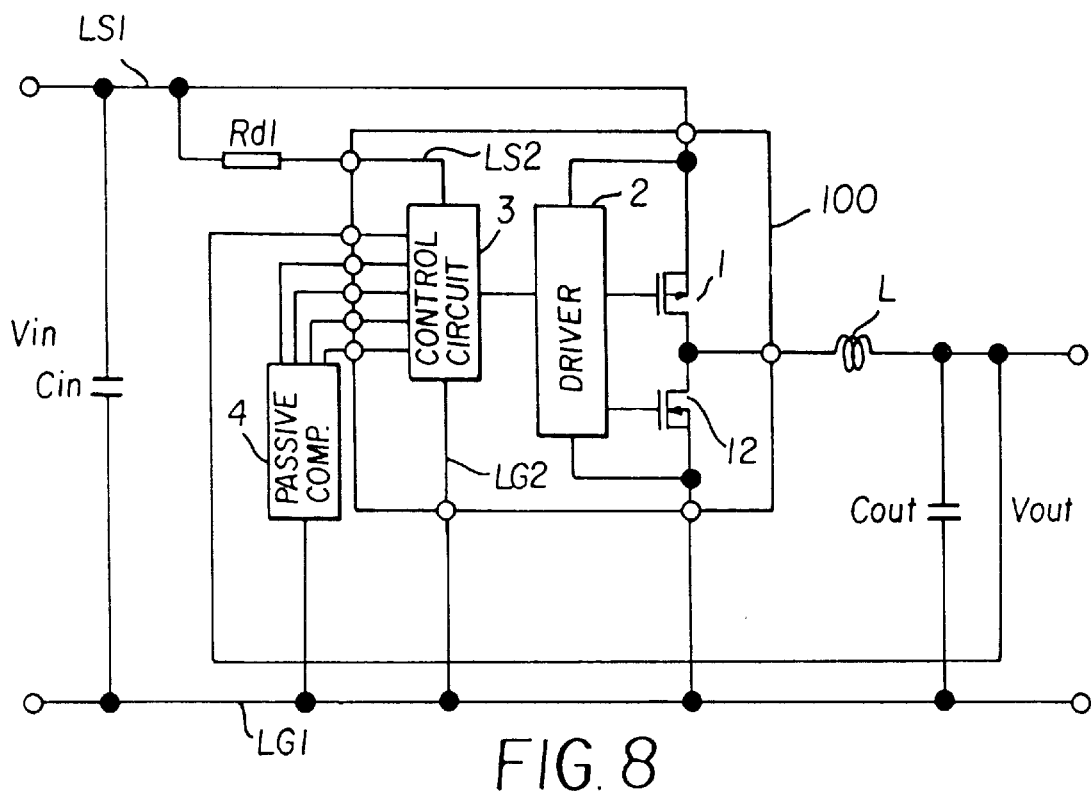
FIG. 8 is a block diagram of a switching DC-DC converter according to a seventh embodiment of the invention.

FIG. 8 is a block diagram of a switching DC-DC converter according to a seventh embodiment of the invention. The switching DC-DC converter according to the seventh embodiment features an external insulation resistor and synchronous commutation. The switching DC-DC converter according to the seventh embodiment may be classified into the second type of circuit connection.

In the switching DC-DC converter according to the seventh embodiment shown in FIG. 8, the insulation resistor Rd2 is eliminated from the circuit configuration of FIG. 4 and a feed line LG2 for a control circuit 3 is connected to a ground line LG1 on the side of a main circuit or to a wiring portion, the potential thereof is the same with the potential of the ground line LG1.

Eighth Embodiment

Figure 9:
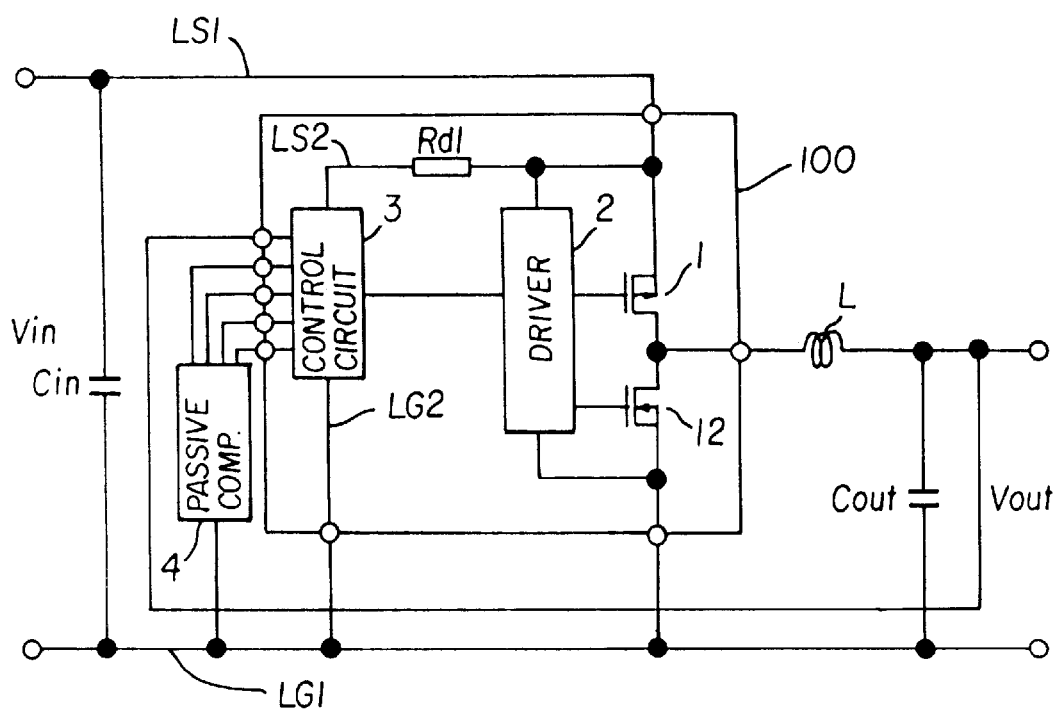
FIG. 9 is a block diagram of a switching DC-DC converter according to an eighth embodiment of the invention.

FIG. 9 is a block diagram of a switching DC-DC converter according to an eighth embodiment of the invention. The switching DC-DC converter according to the eighth embodiment features an internal insulation resistor and synchronous commutation. The switching DC-DC converter according to the eighth embodiment may be classified into the second type of circuit connection.

In the switching DC-DC converter according to the eighth embodiment shown in FIG. 9, the insulation resistor Rd2 is eliminated from the circuit configuration of FIG. 5 and a feed line LG2 for a control circuit 3 is connected to a ground line LG1 on the side of a main circuit or to a wiring portion, the potential thereof is the same with the potential of the ground line LG1.

Ninth Embodiment

Figure 10:
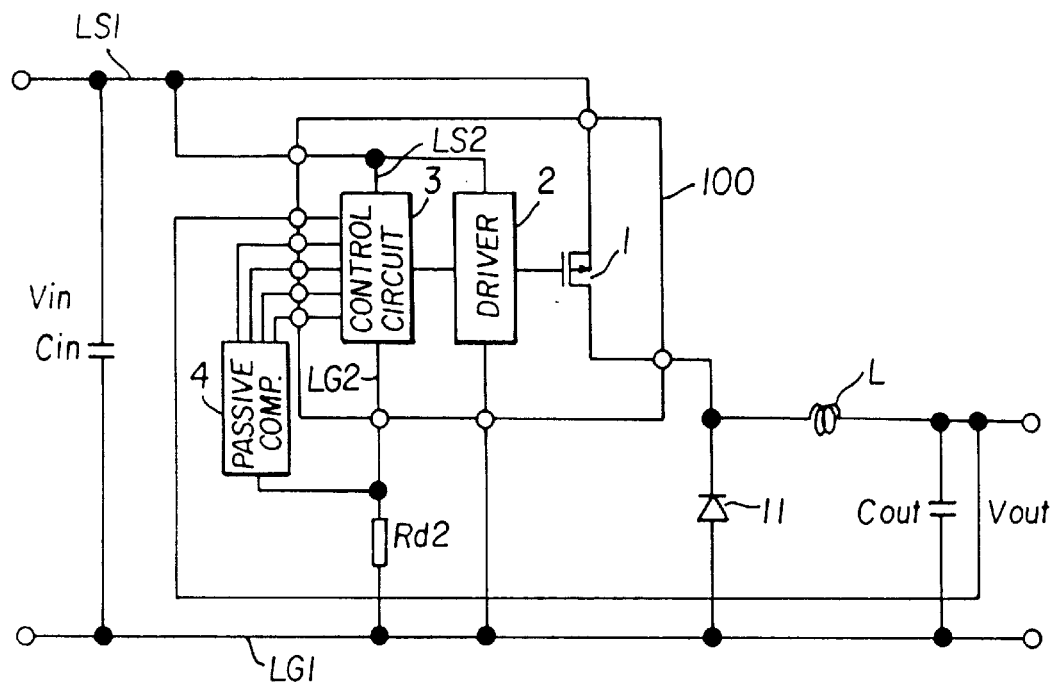
FIG. 10 is a block diagram of a switching DC-DC converter according to a ninth embodiment of the invention.

FIG. 10 is a block diagram of a switching DC-DC converter according to a ninth embodiment of the invention. The switching DC-DC converter according to the ninth embodiment features an external insulation resistor and asynchronous commutation. The switching DC-DC converter according to the ninth embodiment may be classified into the third type of circuit connection shown in FIG. 1(c).

In the switching DC-DC converter according to the ninth embodiment shown in FIG. 10, the insulation resistor Rd1 is eliminated from the circuit configuration of FIG. 2 and a feed line LS2 for a control circuit 3 is connected to a feed line LS1 on the side of a main circuit or to a wiring portion, the potential thereof is the same with the potential of the ground line LS1.

Tenth Embodiment

Figure 11:
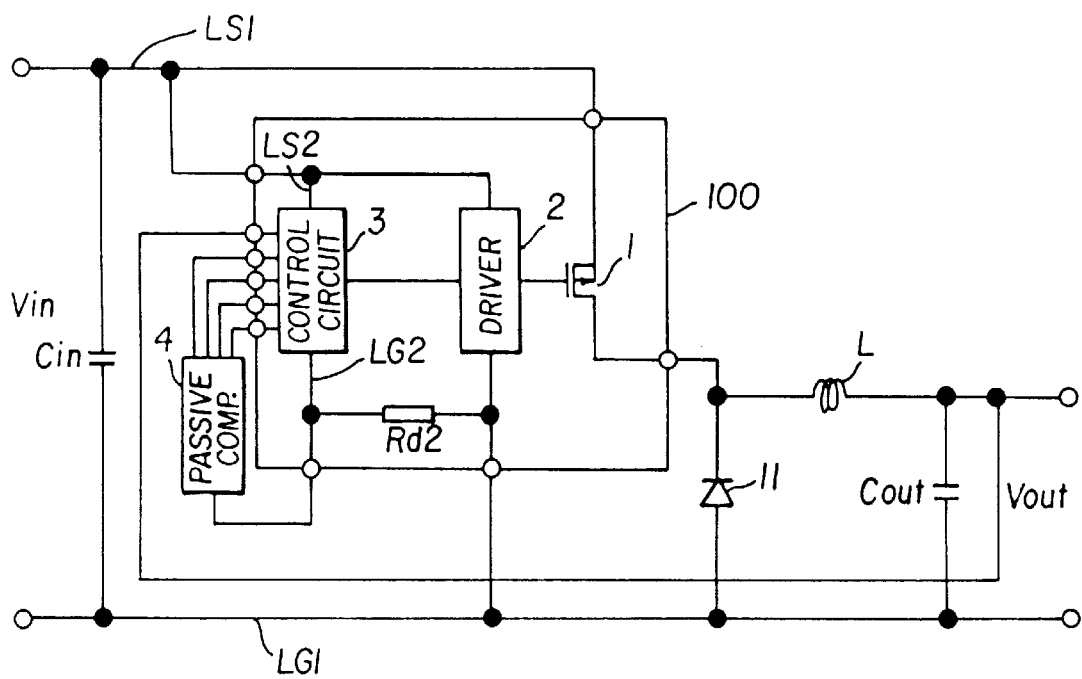
FIG. 11 is a block diagram of a switching DC-DC converter according to a tenth embodiment of the invention.

FIG. 11 is a block diagram of a switching DC-DC converter according to a tenth embodiment of the invention. The switching DC-DC converter according to the tenth embodiment features an internal insulation resistor and asynchronous commutation. The switching DC-DC converter according to the tenth embodiment may be classified into the third type of circuit connection.

In the switching DC-DC converter according to the tenth embodiment shown in FIG. 11, the insulation resistor Rd1 is eliminated from the circuit configuration of FIG. 3 and a feed line LS2 for a control circuit 3 is connected to a feed line LS1 on the side of a main circuit or to a wiring portion, the potential thereof is the same with the potential of the ground line LS1.

Eleventh Embodiment

Figure 12:
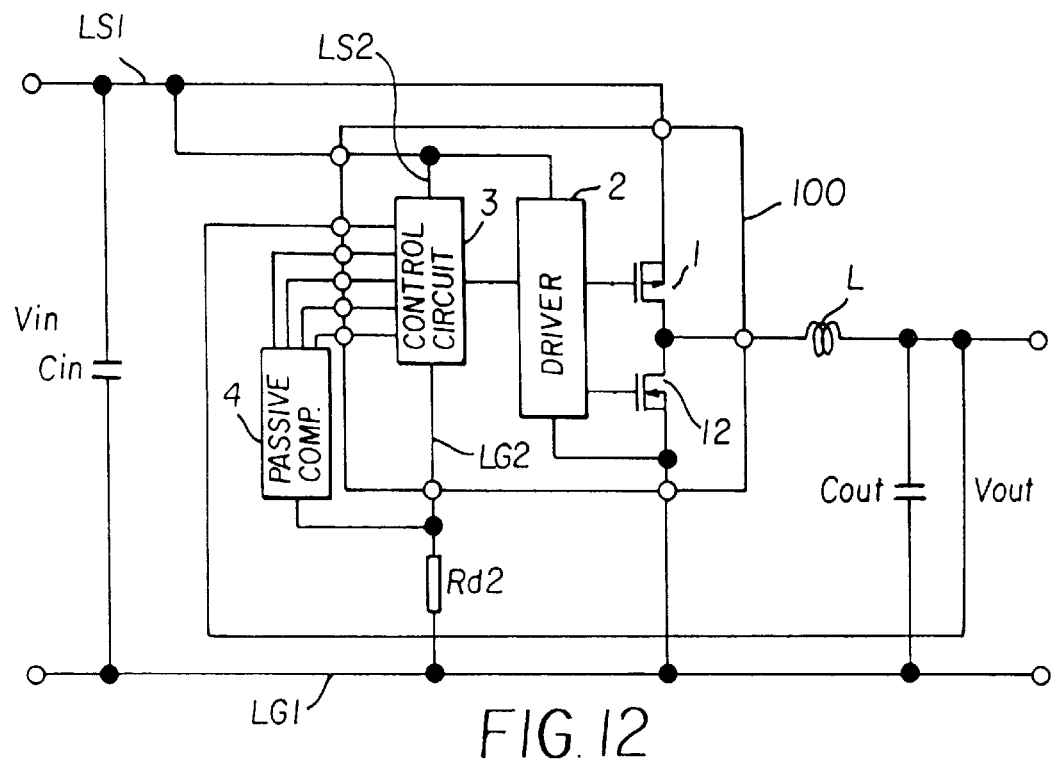
FIG. 12 is a block diagram of a switching DC-DC converter according to an eleventh embodiment of the invention.

FIG. 12 is a block diagram of a switching DC-DC converter according to an eleventh embodiment of the invention. The switching DC-DC converter according to the eleventh embodiment is featured by an external insulation resistor and synchronous commutation. The switching DC-DC converter according to the eleventh embodiment may be classified into the third type of circuit connection.

In the switching DC-DC converter according to the eleventh embodiment shown in FIG. 12, the insulation resistor Rd1 is eliminated from the circuit configuration of FIG. 4 and a feed line LS2 for a control circuit 3 is connected to a feed line LS1 on the side of a main circuit or to a wiring portion, the potential thereof is the same with the potential of the ground line LS1.

Twelfth Embodiment

Figure 13:
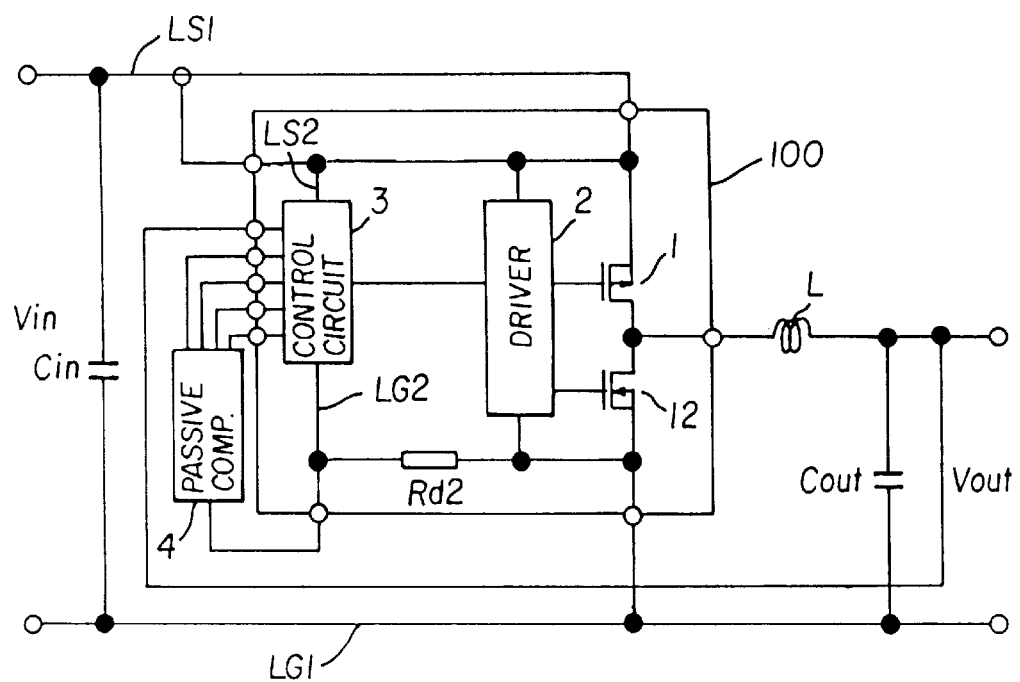
FIG. 13 is a block diagram of a switching DC-DC converter according to a twelfth embodiment of the invention.

FIG. 13 is a block diagram of a switching DC-DC converter according to a twelfth embodiment of the invention. The switching DC-DC converter according to the twelfth embodiment features an internal insulation resistor and synchronous commutation. The switching DC-DC converter according to the twelfth embodiment may be classified into the third type of circuit connection.

In the switching DC-DC converter according to the twelfth embodiment shown in FIG. 13, the insulation resistor Rd1 is eliminated from the circuit configuration of FIG. 5 and a feed line LS2 for a control circuit 3 is connected to a feed line LS1 on the side of a main circuit or to a wiring portion, the potential thereof is the same with the potential of the ground line LS1.

Thirteenth Embodiment

Figure 14:
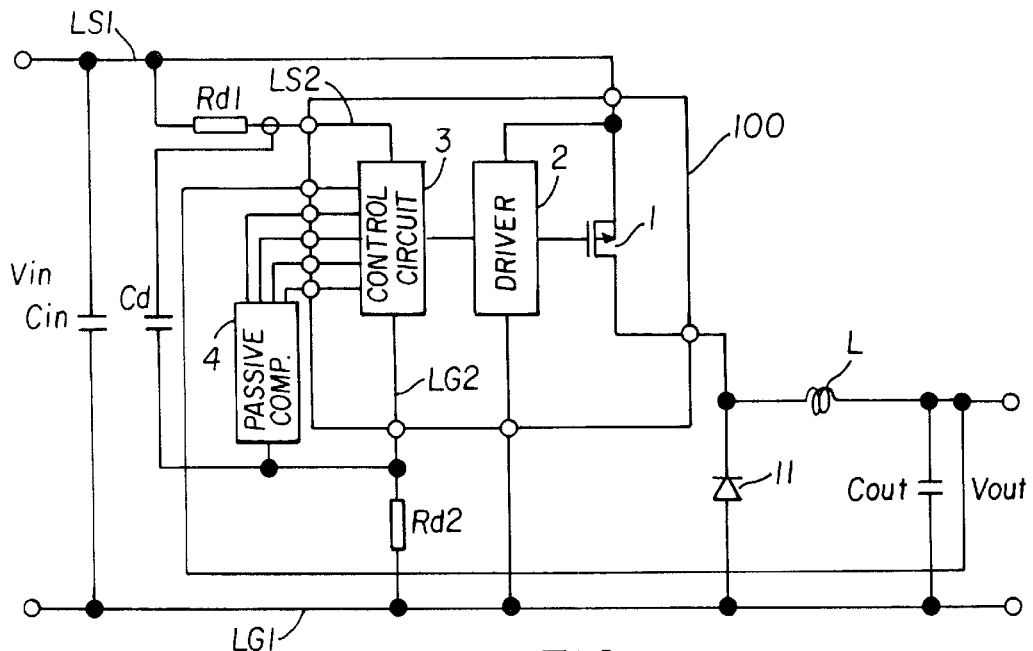
FIG. 14 is a block diagram of a switching DC-DC converter according to a thirteenth embodiment of the invention.

FIG. 14 is a block diagram of a switching DC-DC converter according to a thirteenth embodiment of the invention. The switching DC-DC converter according to the thirteenth embodiment is featured by two external insulation resistors, an external filter capacitor and asynchronous commutation. The switching DC-DC converter according to the thirteenth embodiment may be classified into the fourth type of circuit connection shown in FIG. 1(d).

The switching DC-DC converter according to the thirteenth embodiment includes a filter capacitor Cd for connecting the individual capacitance outside the one-chip IC 100 or for connecting the parasite capacitance of the one-chip IC 100 in the outside thereof. The filter capacitor Cd is connected between the positive feed line LS2 and the negative feed line LG2 for the control circuit 3 of FIG. 2. In short the filter capacitor Cd is connected in parallel to the control circuit 3 including the passive components 4 thereof in FIG. 2.

When the parasite capacitance of the one-chip IC 100 is used, the feed line LS2 or the wiring portion, the potential thereof is the same with the potential of the feed line LS2, and the feed line LG2 or the wiring portion, the potential thereof is the same with the potential of the feed line LG2, are connected to the respective no-shown terminals of the IC 100 for leading out the parasitic capacitance of the IC 100. In the other embodiments described below and including an external filter capacitor disposed outside the IC 100, the circuit connection described above is employed.

Fourteenth Embodiment

Figure 15:
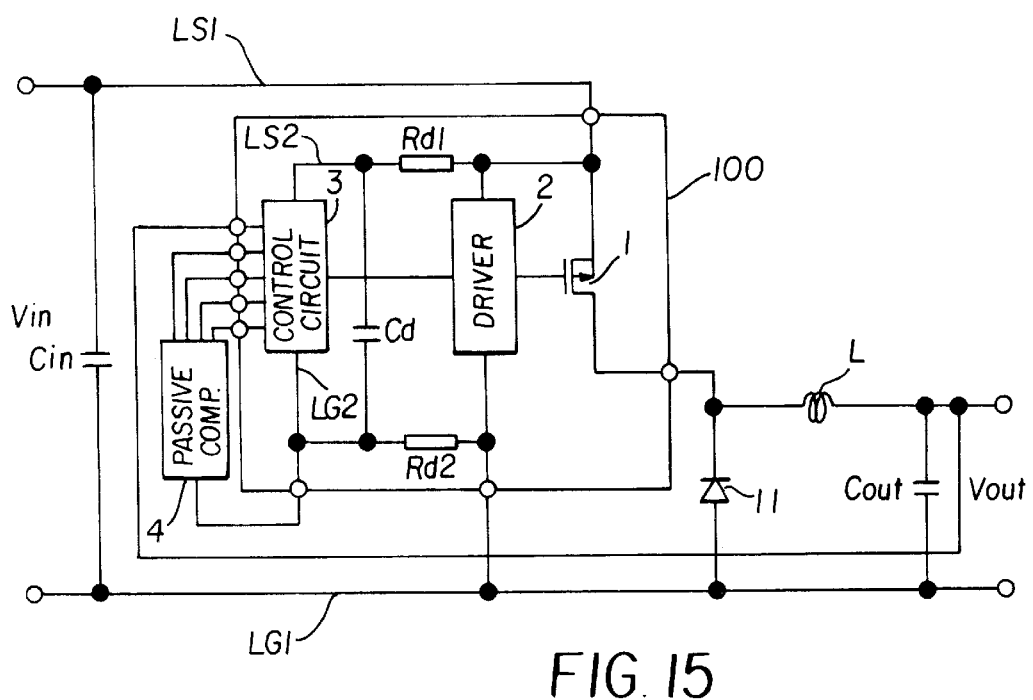
FIG. 15 is a block diagram of a switching DC-DC converter according to a fourteenth embodiment of the invention.

FIG. 15 is a block diagram of a switching DC-DC converter according to a fourteenth embodiment of the invention. The switching DC-DC converter according to the fourteenth embodiment features two internal insulation resistors, an internal filter capacitor and asynchronous commutation. The switching DC-DC converter according to the fourteenth embodiment may be classified into the fourth type of circuit connection.

The switching DC-DC converter according to the twelfth embodiment includes a filter capacitor Cd for connecting the individual capacitance inside the one-chip IC 100 or for connecting the parasite capacitance of the one-chip IC 100 in the inside thereof. The filter capacitor Cd is connected between the positive feed line LS2 and the negative feed line LG2 for the control circuit 3 of FIG. 3. In short, the filter capacitor Cd is connected in parallel to the control circuit 3 including the passive components 4 thereof in FIG. 3.

When the parasite capacitance of the one-chip IC 100 is used, the feed line LS2 or the wiring portion, the potential thereof is the same with the potential of the feed line LS2, and the feed line LG2 or the wiring portion, the potential thereof is the same with the potential of the feed line LG2, are connected to the respective no-shown terminals of the IC 100 for connecting the parasitic capacitance of the IC 100. In the other embodiments described below and including an internal filter capacitor incorporated inside the IC 100, the circuit connection described above is employed.

Fifteenth Embodiment

Figure 16:
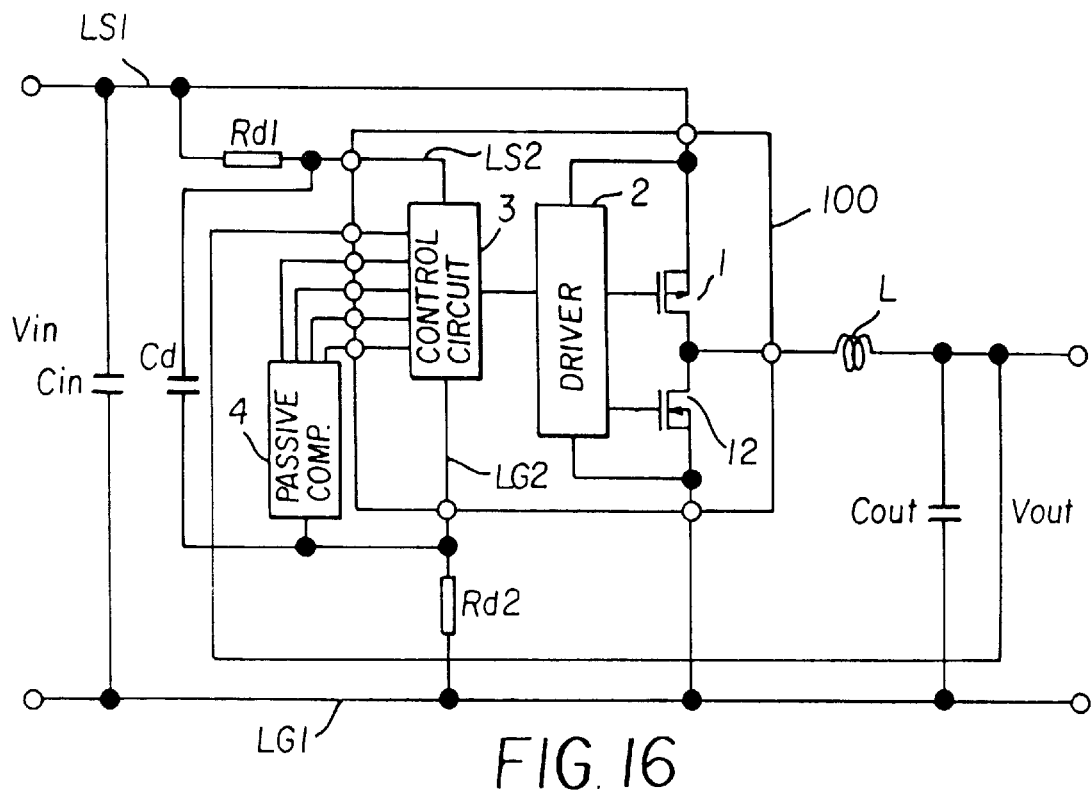
FIG. 16 is a block diagram of a switching DC-DC converter according to a fifteenth embodiment of the invention.

FIG. 16 is a block diagram of a switching DC-DC converter according to a fifteenth embodiment of the invention. The switching DC-DC converter according to the fifteenth embodiment is featured by two external insulation resistors, an external filter capacitor and synchronous commutation. The switching DC-DC converter according to the fifteenth embodiment may be classified into the fourth type of circuit connection.

The switching DC-DC converter according to the fifteenth embodiment includes a filter capacitor Cd for connecting the individual capacitance outside the one-chip IC 100 or for connecting the parasite capacitance of the one-chip IC 100 in the outside thereof. The filter capacitor Cd is connected between the positive feed line LS2 and the negative feed line LG2 for the control circuit 3 of FIG. 4. In short, the capacitor Cd is connected in parallel to the control circuit 3 including the passive components 4 thereof in FIG. 4.

Sixteen Embodiment

Figure 17:
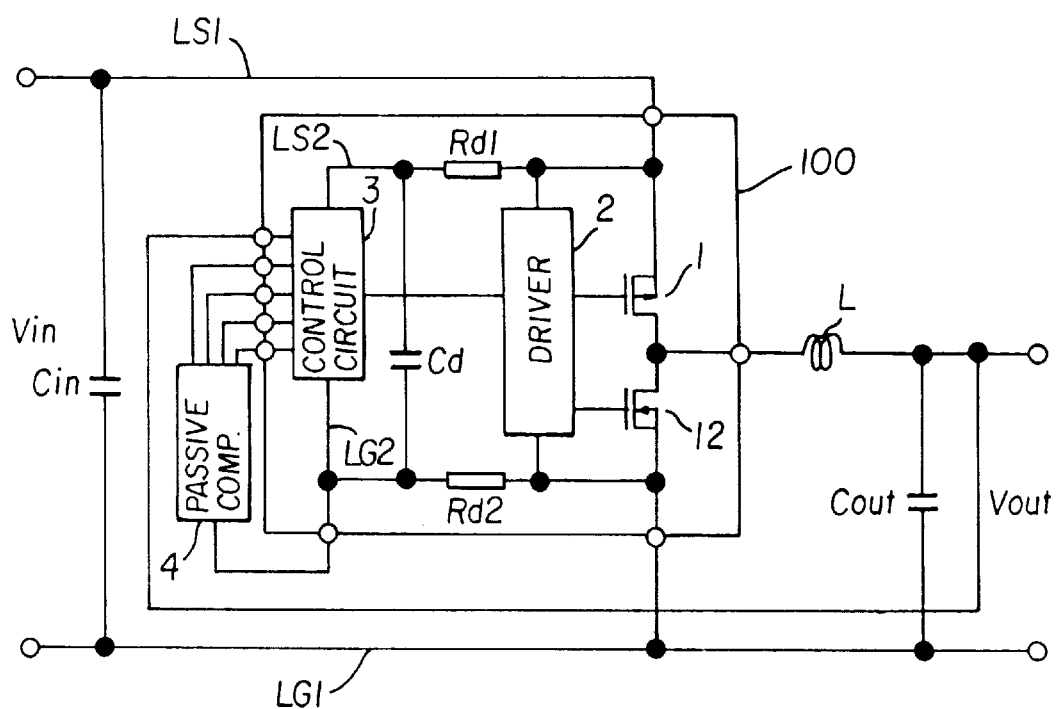
FIG. 17 is a block diagram of a switching DC-DC converter according to a sixteenth embodiment of the invention.

FIG. 17 is a block diagram of a switching DC-DC converter according to a sixteenth embodiment of the invention. The switching DC-DC converter according to the sixteenth embodiment is featured by two internal insulation resistors, an internal filter capacitor and synchronous commutation. The switching DC-DC converter according to the sixteenth embodiment may be classified into the fourth type of circuit connection.

The switching DC-DC converter according to the sixteenth embodiment includes a filter capacitor Cd for connecting the individual capacitance inside the one-chip IC 100 or for connecting the parasite capacitance of the one-chip IC 100 in the inside thereof. The filter capacitor Cd is connected between the positive feed line LS2 and the negative feed line LG2 for the control circuit 3 of FIG. 5. In short, the filter capacitor Cd is connected in parallel to the control circuit 3 including the passive components 4 thereof in FIG. 5.

Seventeenth Embodiment

Figure 18:
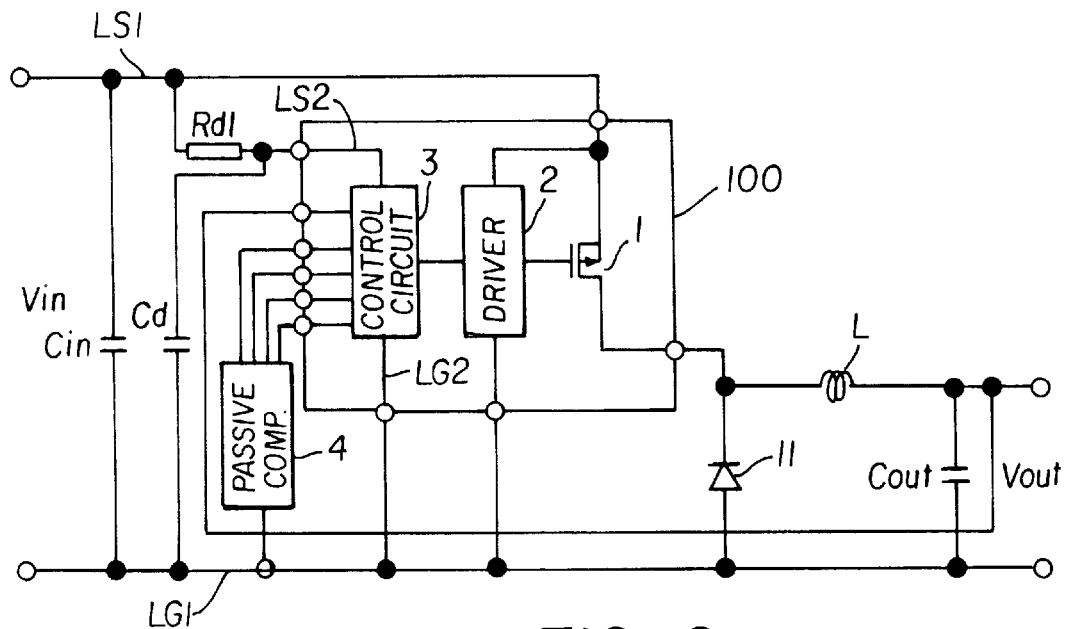
FIG. 18 is a block diagram of a switching DC-DC converter according to a seventeenth embodiment of the invention.

FIG. 18 is a block diagram of a switching DC-DC converter according to a seventeenth embodiment of the invention. The switching DC-DC converter according to the seventeenth embodiment features an external insulation resistor, an external filter capacitor and asynchronous commutation. The switching DC-DC converter according to the seventeenth embodiment may be classified into the fifth type of circuit connection shown in FIG. 1(*e*).

The switching DC-DC converter according to the seventeenth embodiment includes a filter capacitor Cd for connecting the individual capacitance outside the one-chip IC 100 or for connecting the parasite capacitance of the one-chip IC 100 in the outside thereof. The filter capacitor Cd is connected between the feed line LS2 for the control circuit 3 of FIG. 6 and the ground line LG1 for the main circuit of FIG. 6. In short, the filter capacitor Cd is connected in parallel to the control circuit 3 including the passive components 4 thereof in FIG. 6.

Strictly describing, it is desirable to connect the negative electrode of the filter capacitor far from the insulation resistor Rd1 to the negative feed line LG2 for the control circuit 3. However, when the impedance between the connection point of the capacitor Cd on the ground line LG1 and the negative feed terminal of the control circuit 3 is low, the connection shown in FIG. 18 is equivalent to the desirable connection described above and, therefore, within the scope of the present invention.

Eighteenth Embodiment

Figure 19:
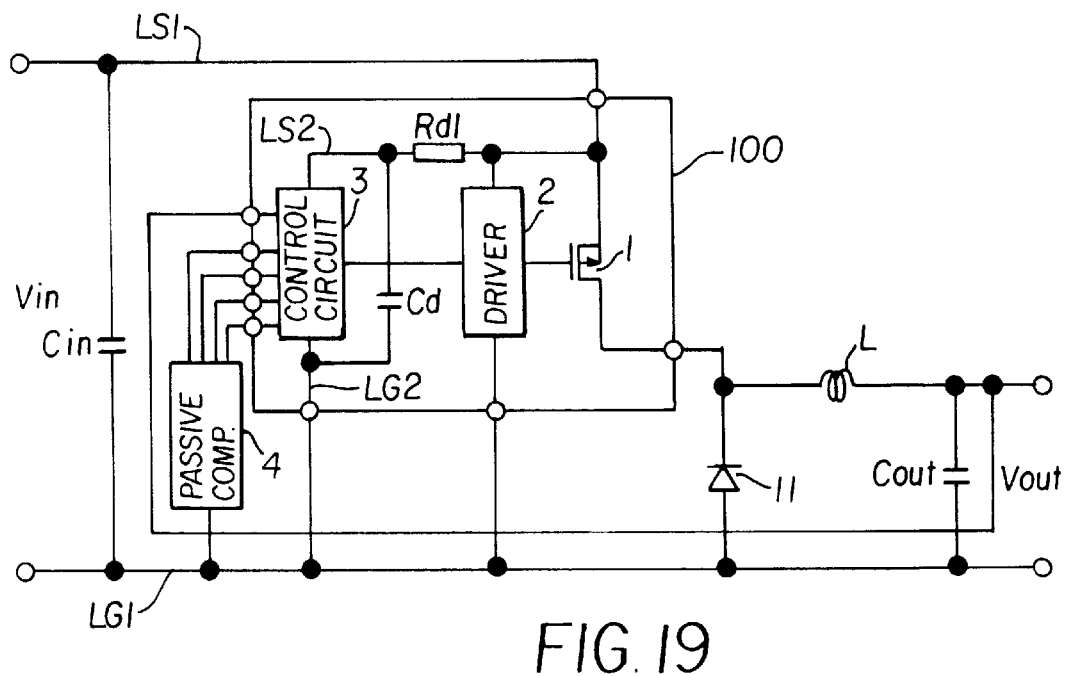
FIG. 19 is a block diagram of a switching DC-DC converter according to an eighteenth embodiment of the invention.

FIG. 19 is a block diagram of a switching DC-DC converter according to an eighteenth embodiment of the invention. The switching DC-DC converter according to the eighteenth embodiment features an internal insulation resistor, an internal filter capacitor and asynchronous commutation. The switching DC-DC converter according to the eighteenth embodiment may be classified into the fifth type of circuit connection.

The switching DC-DC converter according to the eighteenth embodiment includes a filter capacitor Cd for connecting the individual capacitance inside the one-chip IC 100 or for connecting the parasite capacitance of the one-chip IC 100 in the inside thereof. The filter capacitor Cd is connected between the feed lines LS2 and LG2 for the control circuit 3 of FIG. 7. In short, the filter capacitor Cd is connected in parallel to the control circuit 3 including the passive components 4 thereof in FIG. 7.

Nineteenth Embodiment

Figure 20:
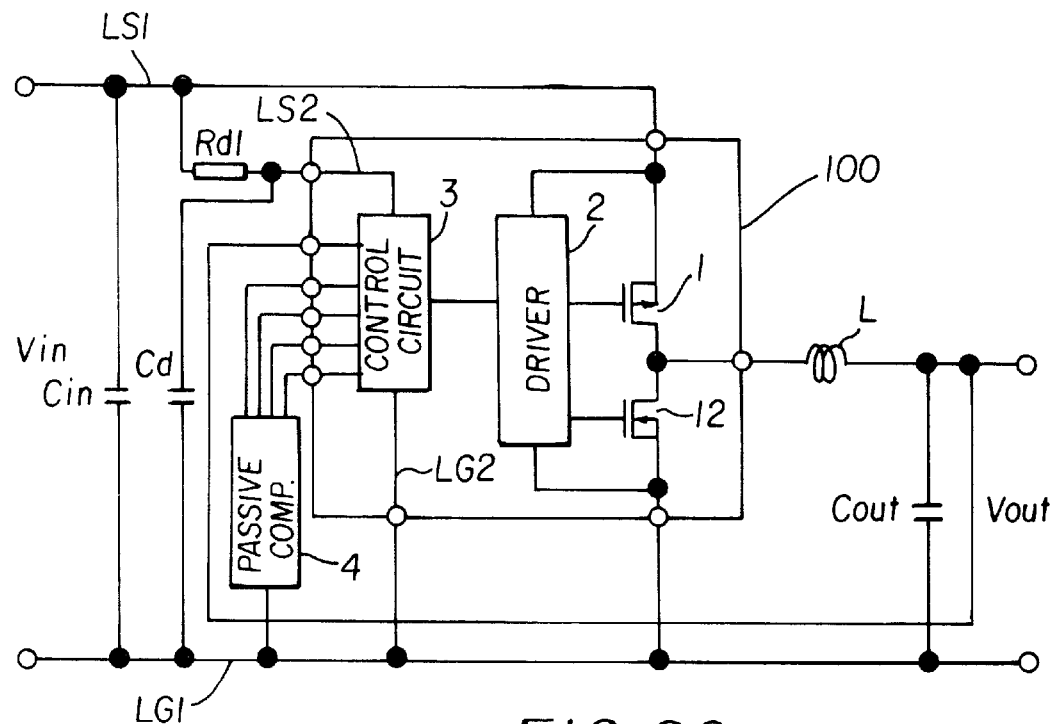
FIG. 20 is a block diagram of a switching DC-DC converter according to a nineteenth embodiment of the invention.

FIG. 20 is a block diagram of a switching DC-DC converter according to a nineteenth embodiment of the invention. The switching DC-DC converter according to the nineteenth embodiment features an external insulation resistor, an external filter capacitor and synchronous commutation. The switching DC-DC converter according to the nineteenth embodiment may be classified into the fifth type of circuit connection.

The switching DC-DC converter according to the nineteenth embodiment includes a filter capacitor Cd for connecting the individual capacitance outside the one-chip IC 100 or for connecting the parasite capacitance of the one-chip IC 100 in the outside thereof. The filter capacitor Cd is connected between the positive feed line LS2 for the control circuit 3 of FIG. 8 and the ground line LG1 for the main circuit of FIG. 8 at the same potential with the negative feed line LG2 for the control circuit 3. In short, the filter capacitor Cd is connected in parallel to the control circuit 3 including the passive components 4 thereof in FIG. 8.

Twentieth Embodiment

Figure 21:
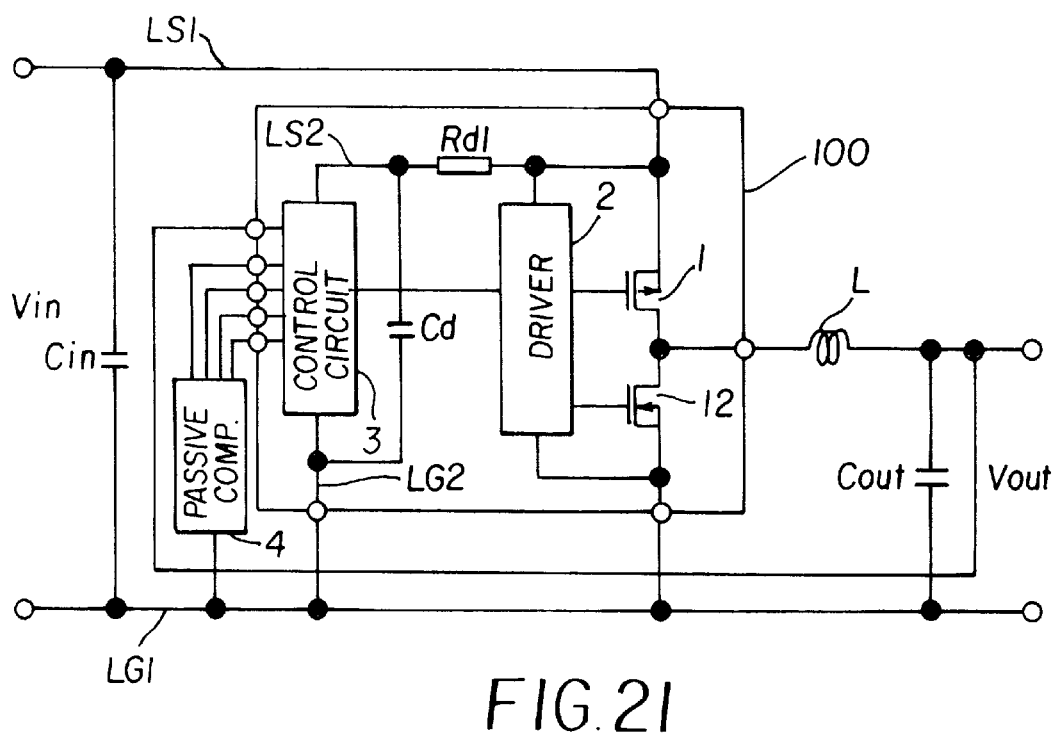
FIG. 21 is a block diagram of a switching DC-DC converter according to a twentieth embodiment of the invention.

FIG. 21 is a block diagram of a switching DC-DC converter according to a twentieth embodiment of the invention The switching DC-DC converter according to the twentieth embodiment features an internal insulation resistor, an internal filter capacitor and synchronous commutation. The switching DC-DC converter according to the twentieth embodiment may be classified into the fifth type of circuit connection.

The switching DC-DC converter according to the twentieth embodiment includes a filter capacitor Cd for connecting the individual capacitance inside the one-chip IC 100 or for connecting the parasite capacitance of the one-chip IC 100 in the inside thereof. The filter capacitor Cd is connected between the feed lines LS2 and LG2 for the control circuit 3 of FIG. 9. In short, the filter capacitor Cd is connected in parallel to the control circuit 3 including the passive components 4 thereof in FIG. 9.

Twenty First Embodiment

Figure 22:
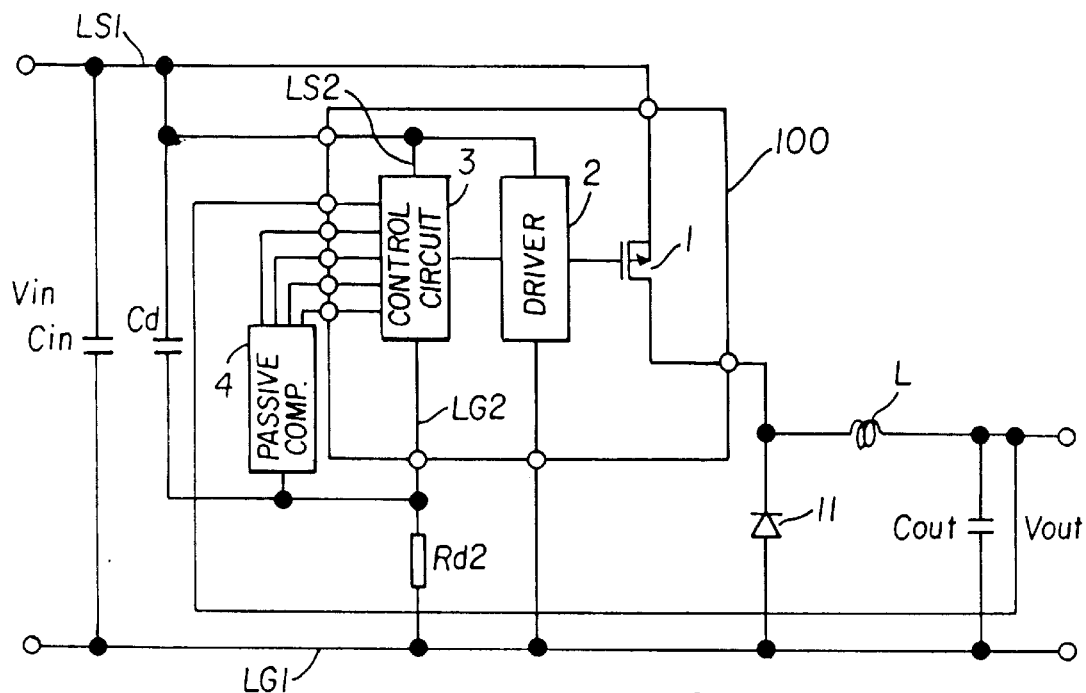
FIG. 22 is a block diagram of a switching DC-DC converter according to a twenty first embodiment of the invention.

FIG. 22 is a block diagram of a switching DC-DC converter according to a twenty first embodiment of the invention. The switching DC-DC converter according to the twenty first embodiment features an internal insulation resistor, an external filter capacitor and asynchronous commutation. The switching DC-DC converter according to the twenty first embodiment may be classified into the sixth type of circuit connection shown in FIG. 1(*f*).

The switching DC-DC converter according to the twenty first embodiment includes a filter capacitor Cd for connecting the individual capacitance outside the one-chip IC 100 or for connecting the parasite capacitance of the one-chip IC 100 in the outside thereof. The filter capacitor Cd is connected between the negative feed line LG2 for the control circuit 3 of FIG. 10 and the power supply LS1 for the main circuit of FIG. 10 at the same potential with the positive feed line LS2 for the control circuit 3. In short, the filter capacitor Cd is connected in parallel to the control circuit 3 including the passive components 4 thereof in FIG. 10.

Strictly speaking, it is desirable to connect the positive electrode of the filter capacitor far from the insulation resistor Rd2 to the positive feed line LS2 for the control circuit 3. However, when the impedance between the connection point of the capacitor Cd on the feed line LS1 and the positive feed terminal of the control circuit 3 is low, the connection shown in FIG. 22 is equivalent to the desirable connection described above and, therefore, within the scope of the present invention.

Twenty Second Embodiment

Figure 23:
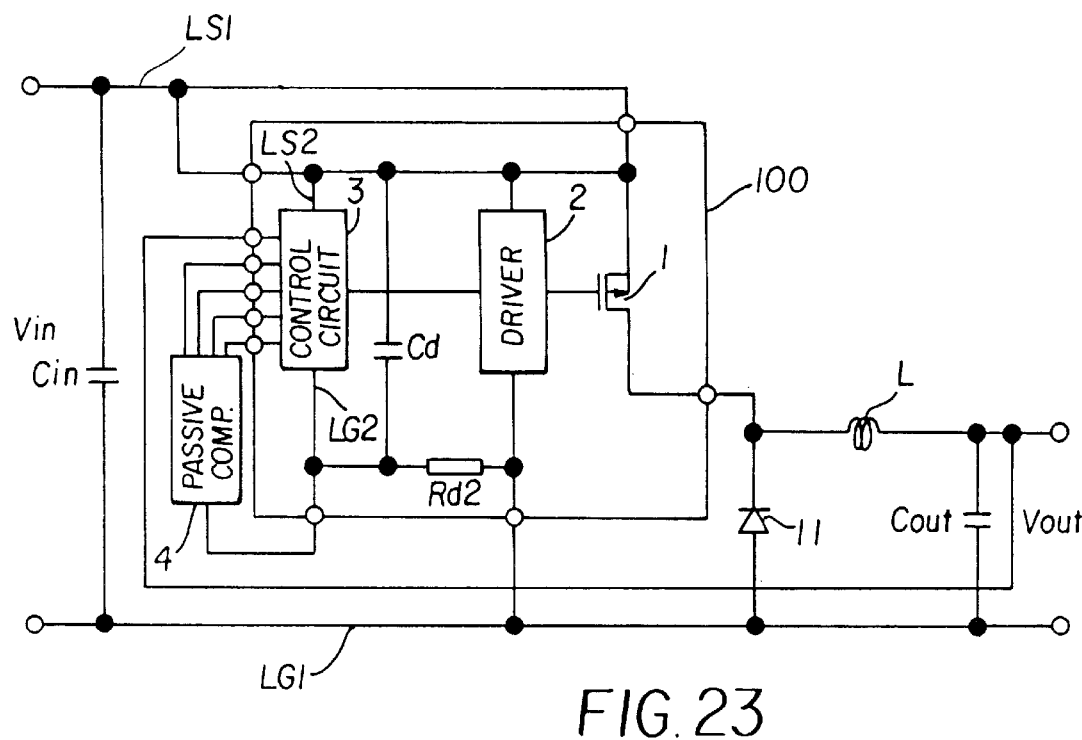
FIG. 23 is a block diagram of a switching DC-DC converter according to a twenty second embodiment of the invention.

FIG. 23 is a block diagram of a switching DC-DC converter according to a twenty second embodiment of the invention. The switching DC-DC converter according to the twenty second embodiment features an internal insulation resistor, an internal filter capacitor and asynchronous commutation. The switching DC-DC converter according to the twenty second embodiment may be classified into the sixth type of circuit connection.

The switching DC-DC converter according to the twenty second embodiment includes a filter capacitor Cd for connecting the individual capacitance inside the one-chip IC 100 or for connecting the parasite capacitance of the one-chip IC 100 in the inside thereof. The filter capacitor Cd is connected between the feed lines LS2 and LG2 for the control circuit 3 of FIG. 11. In short, the filter capacitor Cd is connected in parallel to the control circuit 3 including the passive components 4 thereof in FIG. 11.

Twenty Third Embodiment

Figure 24:
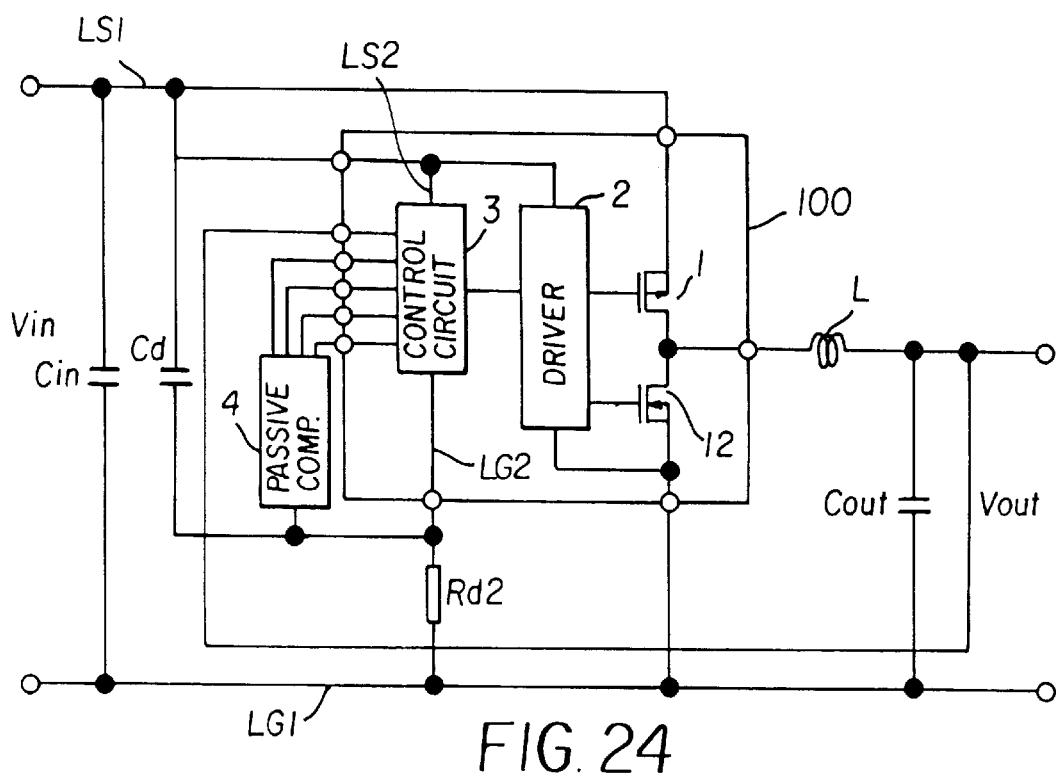
FIG. 24 is a block diagram of a switching DC-DC converter according to a twenty third embodiment of the invention.

FIG. 24 is a block diagram of a switching DC-DC converter according to a twenty third embodiment of the invention. The switching DC-DC converter according to the twenty third embodiment features an external insulation resistor, an external filter capacitor and synchronous commutation. The switching DC-DC converter according to the twenty third embodiment may be classified into the sixth type of circuit connection.

The switching DC-DC converter according to the twenty third embodiment includes a filter capacitor Cd for connecting the individual capacitance outside the one-chip IC 100 or for connecting the parasite capacitance of the one-chip IC 100 in the outside thereof. The filter capacitor Cd is connected between the negative feed line LG2 for the control circuit 3 of FIG. 12 and the feed line LS1 for the main circuit of FIG. 12 at the same potential with the positive feed line LS2 for the control circuit 3. In short, the filter capacitor Cd is connected in parallel to the control circuit 3 including the passive components 4 thereof in FIG. 12.

Twenty Fourth Embodiment

Figure 25:
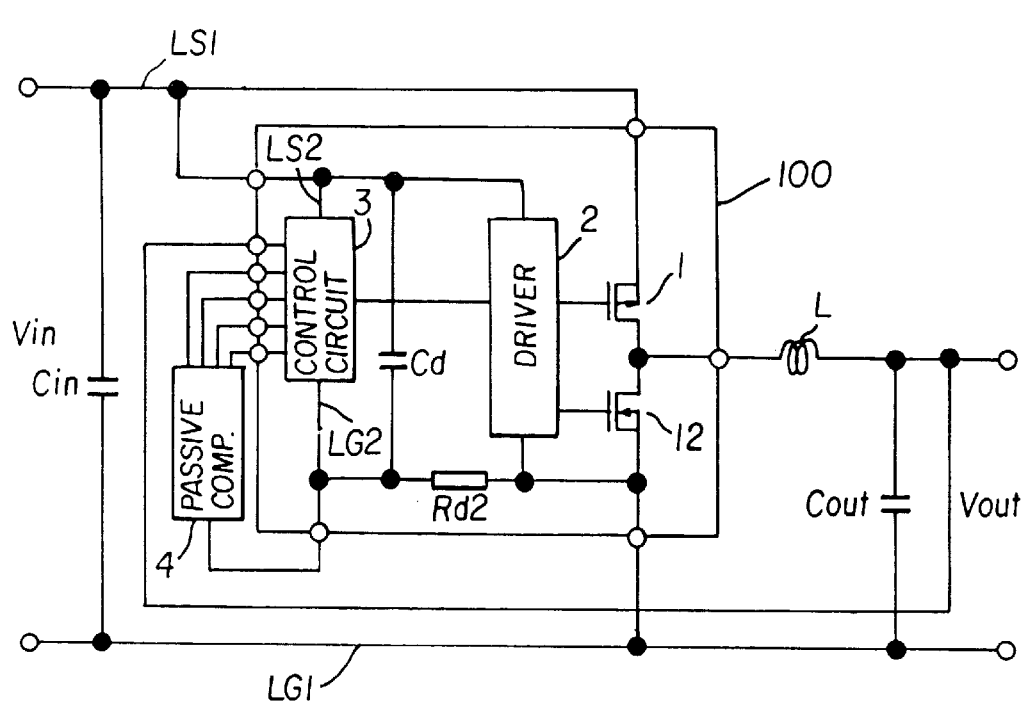
FIG. 25 is a block diagram of a switching DC-DC converter according to a twenty fourth embodiment of the invention.

FIG. 25 is a block diagram of a switching DC-DC converter according to a twenty fourth embodiment of the invention. The switching DC-DC converter according to a twenty fourth embodiment features an internal insulation resistor, an internal filter capacitor and synchronous commutation. The switching DC-DC converter according to a twenty fourth embodiment may be classified into the sixth type of circuit connection.

The switching DC-DC converter according to the twenty fourth embodiment includes a filter capacitor Cd for connecting the individual capacitance inside the one-chip IC 100 or for connecting the parasite capacitance of the one-chip IC 100 in the inside thereof. The filter capacitor Cd is connected between the feed lines LS2 and LG2 for the control circuit 3 of FIG. 13. In short, the filter capacitor Cd is connected in parallel to the control circuit 3 including the passive components 4 thereof in FIG. 13.

Effects of the Invention

Figure 26:
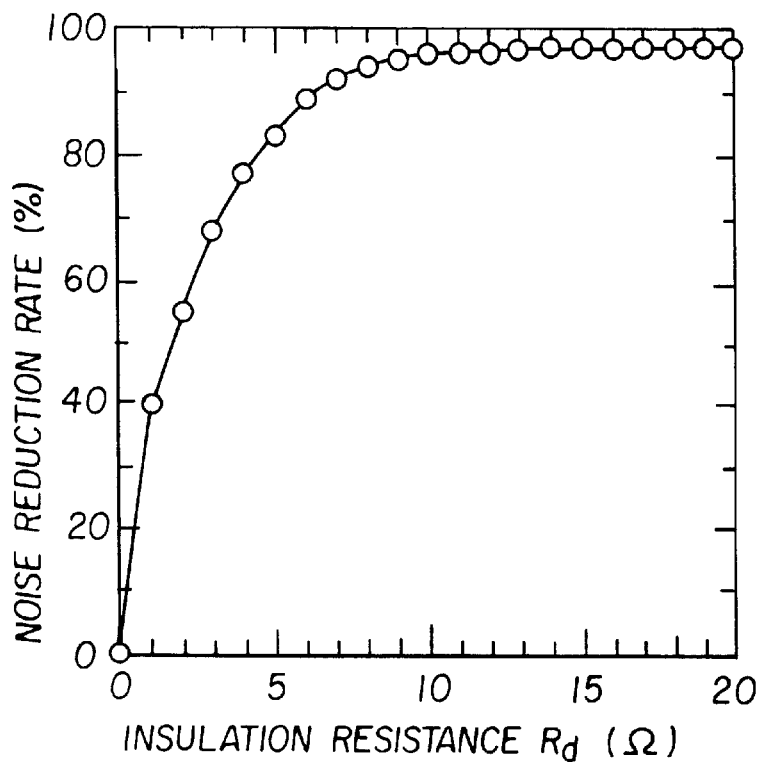
FIG. 26 is a graph relating the reduction rate of the noise in the output of the control circuit attained by the circuit configurations shown in FIGS. 2 through 13 with the insulation resistance.

FIG. 26 is a graph relating the reduction rate of the noise in the output of the control circuit 3 attained by the circuit configurations shown in FIGS. 2 through 13 with the insulation resistance. FIG. 26 confirms that the noise component is eliminated by connecting the insulation resistance Rd (=R1+Rd2).

The resistance Rd of up to 100 Ω is effective. The noise is reduced by about 95% at the resistance of 10 Ω, the control circuit 3 is prevented from malfunction, and the operation of the DC-DC converter is stabilized.

Figure 27:
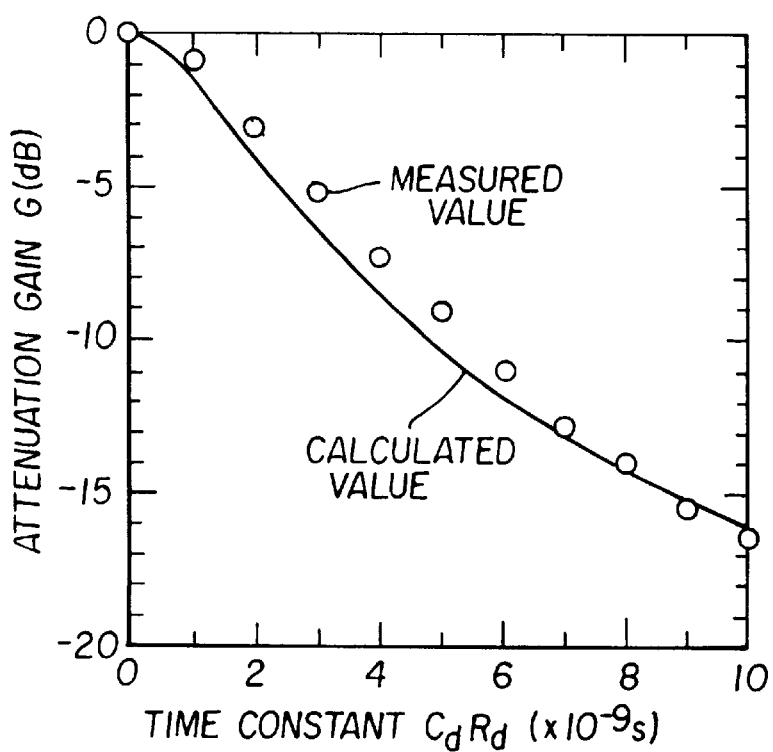
FIG. 27 is a graph relating the attenuation gain of the noise, the frequency thereof is 100 MHz, flowing into the control circuit shown in FIGS. 14 through 25 with the time constant CdRd.

FIG. 27 is a graph relating the attenuation gain of the noise, the frequency thereof is 100 MHz, flowing into the control circuit 3 shown in FIGS. 14 through 25 with the time constant CdRd. FIG. 27 confirms that the noise component is eliminated by connecting the insulation resistance Rd and the capacitance Cd.

At the time constant for the resistance and the capacitance CdRd of about $4 \times 10^{-9}$s, the control circuit 3 operates normally without being adversely affected by the noise, and the DC-DC converter operates stably.

The switching DC-DC converter according to the invention, that includes a one-chip IC incorporating a control circuit including attached circuits thereof, a driver and a main switching transistor; a DC power supply of a main circuit for feeding electric power to all the constituent elements; insulation resistors (or an insulation resistor) disposed in the positive and negative wiring portions (or in the positive or the negative wiring portion) of the control circuit; and, if necessary, a filter capacitor connected in parallel to the control circuit, facilitates preventing a noise current from flowing into the control circuit, preventing the control circuit from malfunction especially under a heavily load or in high-speed switching, and stabilizing the operation of the DC-DC converter. By further incorporating the insulation resistance and the filter capacitance in the IC, the number of the IC terminals and the dimensions of the entire control system are reduced.

The invention has been described with reference to certain preferred embodiments thereof. It will be understood, however, that modifications and variations are possible within the scope of the appended claims.

What is claimed is:

1. A switching DC-DC converter including a one-chip semiconductor integrated circuit; said one-chip semiconductor integrated circuit including at least a main switching semiconductor device including main terminals and a control terminal, said main switching semiconductor device periodically switching on and off, thereby to periodically connect and disconnect a DC power supply, said main switching semiconductor device feeding an output voltage to a load; a control circuit fed from said DC power supply, said control circuit detecting said output voltage outputted from said main switching semiconductor device, said control circuit outputting a control signal indicating the timing of said switching on and off; and a first drive circuit fed from said DC power supply, said first drive circuit feeding a drive signal for switching on and off said main switching semiconductor device to said control terminal thereof in response to said control signal; said switching DC-DC converter comprising:

a positive feed line and a negative feed line connecting said DC power supply to said control circuit including attached passive components thereof; and a resistor inserted in one of said positive feed line and said negative feed line inside or outside said semiconductor integrated circuit, said resistor preventing a noise current from flowing into said control circuit.

2. The switching DC-DC converter according to claim 1, further comprising: another resistor inserted in the other one of said positive feed line and said negative feed line inside or outside said semiconductor integrated circuit, said another resistor preventing said noise current from flowing into said control circuit.

3. The switching DC-DC converter according to claim 1, further comprising: a commutation switching semiconductor device in said one-chip semiconductor integrated circuit, said commutation switching semiconductor device including main terminals and a control terminal, one of said main terminals of said commutation switching semiconductor device being connected to the load-side one of said main terminals of said main switching semiconductor device, said commutation switching semiconductor device being switched off and on in synchronism with said switching on and off of said main switching semiconductor device, whereby to provide a load current path when said main switching semiconductor device is OFF; and a second drive circuit in said one-chip semiconductor integrated circuit, said second drive circuit being fed from said DC power supply, said second drive circuit feeding a drive signal indicating said switching off and on of said commutation switching semiconductor device to said control terminal of said commutation switching semiconductor device.

4. The switching DC-DC converter according to claim 2, further comprising: a commutation switching semiconductor device in said one-chip semiconductor integrated circuit, said commutation switching semiconductor device including main terminals and a control terminal, one of said main terminals of said commutation switching semiconductor device being connected to the load-side of one of said main terminals of said main switching semiconductor device, said commutation switching semiconductor device being switched off and on in synchronism with said switching on and off of said main switching semiconductor device, thereby to provide a load current path when said main switching semiconductor device is OFF; and a second drive circuit in said one-chip semiconductor integrated circuit, said second drive circuit being fed from said DC power supply, said second drive circuit feeding a drive signal indicating said switching off and on of said commutation switching semiconductor device to said control terminal of said commutation switching semiconductor device.

5. The switching DC-DC converter according to claim 1, further comprising: a capacitor disposed inside or outside said semiconductor integrated circuit, said capacitor dividing said noise current, said capacitor being connected between said positive feed line and said negative feed line without said resistor interposed therebetween.

6. The switching DC-DC converter according to claim 3, further comprising: a capacitor disposed inside or outside said semiconductor integrated circuit, said capacitor dividing said noise current, said capacitor being connected between said positive feed line and said negative feed line without said resistor interposed therebetween.

7. The switching DC-DC converter according to claim 2, further comprising: a capacitor disposed inside or outside said semiconductor integrated circuit, said capacitor dividing said noise current, said capacitor being connected between said positive feed line and said negative feed line without any of said resistors interposed therebetween.

8. The switching DC-DC converter according to claim 4, further comprising: a capacitor disposed inside or outside said semiconductor integrated circuit, said capacitor dividing said noise current, said capacitor being connected between said positive feed line and said negative feed line without any of said resistors interposed therebetween.

9. The switching DC-DC converter according to claim 1, wherein said positive feed line or said negative feed line connects said resistor incorporated in said semiconductor integrated circuit to said control circuit without any lead-out terminal of said semiconductor integrated circuit interposed therebetween.

10. The switching DC-DC converter according to claim 2, wherein said positive feed line and said negative feed line connect said resistors incorporated in said semiconductor integrated circuit to said control circuit without any lead-out terminal of said semiconductor integrated circuit interposed therebetween.

11. The switching DC-DC converter according to claim 5, wherein said capacitor comprising a parasitic capacitance of said semiconductor integrated circuit.

12. The switching DC-DC converter according to claim 6, wherein said capacitor comprises a parasitic capacitance of said semiconductor integrated circuit.

13. The switching DC-DC converter according to claim 7, wherein said capacitor comprises a parasitic capacitance of said semiconductor integrated circuit.

14. The switching DC-DC converter according to claim 8, wherein said capacitor comprises a parasitic capacitance of said semiconductor integrated circuit.

* * * * *